(12) United States Patent
Lucco et al.

(10) Patent No.: US 7,627,541 B2
(45) Date of Patent: Dec. 1, 2009

(54) TRANSFORMATION OF MODULAR FINITE STATE TRANSDUCERS

(75) Inventors: Steven E. Lucco, Bellevue, WA (US); David E. Langworthy, Kirkland, WA (US); Giovanni M. Della-Libera, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 327 days.

(21) Appl. No.: 11/532,374

(22) Filed: Sep. 15, 2006

(65) Prior Publication Data

US 2008/0071802 A1    Mar. 20, 2008

(51) Int. Cl.
- G06E 1/00    (2006.01)
- G06E 3/00    (2006.01)
- G06F 15/18   (2006.01)
- G06G 7/00    (2006.01)

(52) U.S. Cl. ..................................................... 706/16
(58) Field of Classification Search ................... 706/16
See application file for complete search history.

(56) References Cited

U.S. PATENT DOCUMENTS

| | | | |
|---|---|---|---|
| 5,806,032 A | 9/1998 | Sproat | |
| 6,032,111 A | 2/2000 | Mohri | |
| 6,128,606 A | 10/2000 | Bengio et al. | |
| 6,308,149 B1* | 10/2001 | Gaussier et al. | 704/9 |
| 6,735,592 B1* | 5/2004 | Neumann et al. | 707/101 |
| 7,069,215 B1* | 6/2006 | Bangalore et al. | 704/255 |
| 7,072,880 B2* | 7/2006 | Beesley | 707/2 |
| 7,107,205 B2* | 9/2006 | Kempe | 704/2 |
| 7,113,903 B1* | 9/2006 | Riccardi et al. | 704/4 |
| 7,120,586 B2* | 10/2006 | Loui et al. | 704/275 |
| 7,181,386 B2* | 2/2007 | Mohri et al. | 704/1 |
| 7,197,460 B1* | 3/2007 | Gupta et al. | 704/270.1 |
| 7,222,067 B2* | 5/2007 | Glushnev et al. | 704/10 |
| 7,225,131 B1* | 5/2007 | Bangalore et al. | 704/270 |
| 7,240,004 B1* | 7/2007 | Allauzen et al. | 704/255 |
| 7,243,305 B2* | 7/2007 | Schabes et al. | 715/257 |
| 7,257,575 B1* | 8/2007 | Johnston et al. | 707/4 |
| 7,295,975 B1* | 11/2007 | Bangalore et al. | 704/231 |
| 7,299,180 B2* | 11/2007 | Wang et al. | 704/257 |
| 7,340,388 B2* | 3/2008 | Soricut et al. | 704/4 |
| 7,383,185 B1* | 6/2008 | Mohri | 704/251 |
| 7,398,197 B1* | 7/2008 | Mohri et al. | 704/1 |

(Continued)

OTHER PUBLICATIONS

Finite state transducers for policy evaluation and conflict resolution Baliosian, J.; Serrat, J.; Policies for Distributed Systems and Networks, 2004. Policy 2004. Proceedings. Fifth IEEE International Workshop on Jun. 7-9, 2004 pp. 250-259 Digital Object Identifier 10.1109/POLICY.2004.1309177.*

(Continued)

Primary Examiner—Michael B Holmes
(74) Attorney, Agent, or Firm—Turocy & Watson, LLP

(57) ABSTRACT

A Q Framework, or QFX for short, is provided for performing efficient tree transformation in a generalized manner that achieves preservation of action semantics for FSTs that support action information in their representations across a diverse set of types of representations for FSTs. Among other features, the QFX also enables the preservation of ordered and unordered nest information while performing tree transformation, supports the transformation of non-deterministic data structures to a deterministic data structure and enables intersection operations on machines having action semantics.

20 Claims, 25 Drawing Sheets

U.S. PATENT DOCUMENTS

| | | | |
|---|---|---|---|
| 7,401,303 B2 | | 7/2008 | Gunawardana |
| 7,451,089 B1 * | | 11/2008 | Gupta et al. ............. 704/270.1 |
| 7,451,125 B2 | | 11/2008 | Bangalore |
| 7,493,251 B2 * | | 2/2009 | Gao et al. ...................... 704/8 |
| 7,499,862 B1 * | | 3/2009 | Bangalore et al. ........... 704/275 |
| 7,505,908 B2 * | | 3/2009 | Johnston et al. ............. 704/275 |
| 7,536,295 B2 * | | 5/2009 | Cancedda et al. ............. 704/4 |
| 7,542,893 B2 * | | 6/2009 | Cancedda et al. ............. 704/2 |
| 7,542,908 B2 * | | 6/2009 | Segond et al. ............... 704/277 |
| 2004/0176945 A1 | | 9/2004 | Inagaki et al. |
| 2005/0154979 A1 | | 7/2005 | Chidlovskii et al. |
| 2006/0085389 A1 | | 4/2006 | Flanagan et al. |

OTHER PUBLICATIONS

Large vocabulary continuous Mandarin speech recognition using finite state machine Yi-Cheng Pan; Chia-Hsing Yu; Lin-Shan Lee; Chinese Spoken Language Processing, 2004 International Symposium on Dec. 15-18, 2004 pp. 5-8 Digital Object Identifier 10.1109/CHINSL.2004.1409572.*

Interactive grammar inference with finite state transducers Caskey, S.P.; Story, E.; Pieraccini, R.; Automatic Speech Recognition and Understanding, 2003. ASRU '03. 2003 IEEE Workshop on Nov. 30-Dec. 3, 2003 pp. 572-576 Digital Object Identifier 10.1109/ASRU.2003.1318503.*

Efficient Generation of high-order context-dependent Weighted Finite State Transducers for Speech Recognition Schuster, M.; Hori, T.; Acoustics, Speech, and Signal Processing, 2005. Proceedings. (ICASSP '05). IEEE International Conference on vol. 1, Mar. 18-23, 2005 pp. 201-204 Digital Object Identifier 10.1109/ICASSP.2005.1415085.*

Finite state transducers for policy evaluation and conflict resolution Baliosian, J.; Serrat, J.; Policies for Distributed Systems and Networks 2004 Policy 2004. Proceedings. Fifth IEEE International Workshop on Jun. 7-9, 2004 pp. 250-259 Digital Object Identifier 10.1109/Policy.2004.1309177.*

Large vocabulary continuous Mandarin speech recognition using finite state machine Yi-Cheng Pan; Chia-Hsing Yu; Lin-Shan Lee; Chinese Spoken Language Processing, 2004 International Symposium on Dec. 15-18, 2004 pp. 5-8 Digital Object Identifier 10.1109/CHINSL.2004.1409572.*

Construction of weighted finite state transducers for very wide context-dependent acoustic models Schuster, M.; Hori, T.; Automatic Speech Recognition and Understanding, 2005 IEEE Workshop on Nov. 27-27 2005 pp. 162-67 Digital Object Identifier 10.1109/ASRU.2005.1566482.*

Evolving finite state transducers to interpret deepwater reservoir depositional environments Yu, T.; Wilkinson, D.; Clark, J.; Sullivan, M.; Evolutionary Computation, 2008. CEC 2008. (IEEE World Congress on Computational Intelligence). IEEE Congress on Jun. 1-6, 2008 pp. 3491-3498 Digital Object Identifier 10.1109/Cec.2008.4631270.*

Interactive grammar inference with finite state transducers Caskey, S.P.; Story, E.; Pieraccini, R.; Automatic Speech Recognition and Understanding, 2003. ASRU '03. 2003 IEEE Workshop on Nov. 30, Dec. 3, 2003 pp. 572-576 Digital Object Identifier 10.1109/ASRU.2003.1318503.*

Efficient Generation of high-order context-dependent Weighted Finite State Transducers for Speech Recognition Schuster, M.; Hori, T.; Acoustics, Speech, and Signal Processing, 2005. Proceedings. (ICASSP '05). IEEE International Conference on vol. 1, Mar. 18-23, 2005 pp. 201-204 Digital Object Identifier 10.1109/Icassp.2005.1415085.*

Grapheme-to-phone using finite-state transducers Caseiro, D.; Trancoso, L.; Oliveira, L.; Viana, C.; Speech Synthesis, 2002. Proceedings of 2002 IEEE Workshop on Sept.11-13, 2002 pp. 215-218 Digital Object Identifier 10.1109/WSS.2002.1224412.*

Multilingual text analysis for text-to-speech synthesis Sproat, R.; Spoken Language, 1996. ICSLP 96. Proceedings., Fourth International Conference on vol. 3, Oct. 3-6, 1996 pp. 1365-1368 vol. 3 Digital Object Identifier 10.1109/ICSLP.1996.607867.*

N. Susumu, et al., XML stream transformer generation through program composition and dependency analysis. Science of Computer Programming. Feb. 2005, vol. 54, pp. 257-290, ISSN 0167-6423.

International Search Report dated Jan. 7, 2008 for PCT Application Serial No. PCT/US2007/078540, 2 Pages.

Graehl, et al., "Training tree transducers." In Human Language Technology Conference of the North American Chapter of the Association for Computational Linguistics (HLT-NAACL), Boston, May 2004, pp. 105-112.

International Search Report and Written Opinion dated Feb. 29, 2008 for PCT Application Serial No. PCT/US2007/078522, 10 Pages.

Alfred Aho, Ravi Sethi, and Jeffrey Ullman. Compilers: Principles, Techniques and Tools. Addison-Wesley, 1986.

John Hopcroft, Jeffrey Ullman, and Rajeev Motwani. Introduction to Automata Theory, Languages and Computation. Addison-Wesley, 2000.

* cited by examiner

```
interface XEControlInstructions {
        IEnvironment CurrentEnvironment { get; set; }
        IContinuation CurrentContinuation { get; }
        IContinuation Call(XEInstance target, IContinuation continuation,
                        IEnvironment callingEnvironment);
        IContinuation Return();
        void Mark();
        object Yield();
        IEnvironment NewEnvironment();
        void PushEnvironment(string variableName);
        void PopEnvironment();
        void Exec(ActionReference action);
}
```

```
void PushEnvironment(string variableName) {
        IEnvironment tempEnv;
        environmentStack.Push(CurrentEnvironment);
        tempEnv=NewEnvironment();
        Bind(varName,tempEnv);
        CurrentEnvironment=tempEnv;
        Mark();
}
```

```
void PopEnvironment() {
    Bind("term",Yield());
    environmentStack.Pop();
    CurrentEnvironment=environmentStack.Peek();
}
```
220

FIG. 2C

```
interface XEEnvironmentInstructions {
    IEnvironment ChildEnv();
    bool Bind(string variableName,object value);
    bool Lookup(string variableName,out object value);
}
```
230

FIG. 2D

```
public static Set<State<T>> EClosure(Set<State<T>> nfaStates,
                                      List<Action> actions) {
    Set<State<T>> eClosure = new Set<State<T>>();
    Stack<State<T>> stack = new Stack<State<T>>();

foreach (State<T> nfaState in nfaStates) {
        stack.Push(nfaState);
        eClosure.Insert(nfaState);
    } while (stack.Count > 0) {
        State<T> nfaSrc = stack.Pop();
        foreach (Transition<T> t in nfaSrc.EpsTransitions) {
(A1)        if (t.Action!=null)
(A2)            actions.Add(t.Action);
            foreach (State<T> nfaDst in t.States) {
                if (!(eClosure.Contains(nfaDst))) {
                    eClosure.Insert(nfaDst);
                    stack.Push(nfaDst);
                }
            }
        }
    }
    return (eClosure);
}
```

```
public NFA<T> SubsetConstruction(List<T> lexicon) {
        State<T> startDFAState =
                State<T>.SubsetState(State<T>.EClosure(startState));
        NFA<T> dfa = SubsetDFA(startDFAState);

Queue<State<T>> q = new Queue<State<T>>();
        q.Enqueue(startDFAState);

while (q.Count > 0) {
                State<T> src = q.Dequeue();
                foreach (T symbol in lexicon) {
(B1)                    List<Actions> symActions=new List<Actions>();
(B2)                    Set<State<T>> neighbors=src.Move(symbol,symActions);
(B3)                    List<Actions> epsActions=new List<Actions>();
(B4)                    Set<State<T>> eclosure=
                                State<T>.EClosure(neighbors,epsActions);

State<T> dst = State<T>.SubsetState(eclosure);
(B5)                    src.AddTransition(symbol,dst,symActions);
(B6)                    src.AddActions(epsActions);
                        return (dfa);
                }
        }
}
```

250

FIG. 2F $$P_1 \cup_L P_2$$

$$\cup(P_1) \quad \cup(P_2) \quad \Gamma(P_1) \quad \Gamma(P_2)$$

$$\cup(P_1 \cup_L P_2) = \cup(P_1) \cup_L \cup(P_2)$$

&

$$\Gamma(P_1 \cup_L P_2) = \Gamma(P_1) * \Gamma(P_2)$$

Labeled Union
Cross Product
LUCP

State Transition Table STT1

| Current State/Condition | State A | State B | State C |
|---|---|---|---|
| Condition X | ... | ... | ... |
| Condition Y | ... | State C | ... |
| Condition Z | ... | ... | ... |

FIG. 7A

State Table ST1

| State Name SN | Conditions CO | Actions AC |
|---|---|---|
| Current State | Entry Action | Output Name(s) |
| | Exit Action | Output Name(s) |
| | Virtual Condition | Output Name(s) |
| | ... | ... |
| Next State Name | Virtual Condition | Output Name(s) |
| Next State Name | Virtual Condition | Output Name(s) |
| ... | ... | ... |

FIG. 7B

Moore Representation 800

Mealy Representation 810

TRANSFORMATION OF MODULAR FINITE STATE TRANSDUCERS

CROSS REFERENCE TO RELATED APPLICATIONS

This application is related to co-pending U.S. patent application Ser. No. 11/532,349, filed Sep. 15, 2006, entitled "TRANSFORMATION OF MODULAR FINITE STATE TRANSDUCERS", the entirety of which is incorporated herein by reference.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2005-2006, Microsoft Corp.

TECHNICAL FIELD

The invention is directed generally to finite state automata, such as finite state transducers, and more specifically, to the transformation thereof.

BACKGROUND

By way of general background, finite state machines (FSMs), also known as finite state automata (FSA) are models of behavior for systems composed of states, transitions and actions. FSMs, or FSA, can be represented in a variety of conceptual ways, using state diagrams, state transition diagrams, state tables, labeled directed graphs, trees, etc, which preserve the relationships of states, transitions and actions that comprise the machines, or automata. There are different kinds of FSMs or FSA, equivalencies among them, and various known conversions among some of them as well.

Presently, some graph transducers and tree transducers exist that accomplish some aspects of transforming a set of systems modeled by FSTs, e.g., for some types of directed graph data structure(s), to form a new FST or set of FSTs, e.g., new directed graph data structure(s), however, such systems are limited for various reasons. The Extensible Stylesheet Language Transformation (XSLT), for instance, is an XML-based language used for the transformation of XML documents. When used to transform other XML documents, the document is not changed; rather, a new document is created based on the content of the existing XML document. The new document may be serialized (output) by the processor in standard XML syntax or in another format, such as HTML or plain text. XSLT is often used to convert data between different XML schemas or to convert XML data into web pages or PDF documents.

In essence, XSLT allows the creation of an XML document that describes the transformation of other XML documents, which may in turn be translated to different formats. However, XSLT fails to take into account action semantics that can be represented in FSTs. In this respect, an action might be "when in a pre-defined state, once certain information is recognized, e.g., a name, perform some action." However, to the extent that such arbitrary actions can be defined for an FST, XSLT is unable to handle calls to such arbitrary actions as part of its transformative capabilities. In addition, XSLT is unable to perform all of the complement, intersect and union operations on machines.

Still further, existing transforms, such as XSLT, are also unable to match and compose FSMs having both ordered and unordered hierarchical information, such as ordered and unordered nests (e.g., as represented as a tree structure). While, in certain circumstances, there are some systems that can handle preservation of only ordered information when transforming trees, and there are some systems that can handle preservation of only unordered information when transformation, neither XSLT, nor any other known system, includes transformative capabilities that can preserve both ordered and unordered nests across directed graphs or tree structures. These and other deficiencies in the state of the art of transformation of finite state transducers will become apparent upon description of the various exemplary non-limiting embodiments of the invention set forth in more detail below.

SUMMARY

In consideration of the above-described deficiencies of the state of the art, the invention provides a general framework for performing efficient tree transformation for FSTs, e.g., intersections, unions, complements, etc., that preserves action semantics across transformative operations for FSTs that support action information in their representations across a diverse set of types of representations. The framework for performing efficient tree transformation for FSTs is also able to preserve ordered and unordered nest information while performing tree transformation and is capable of supporting the transformation of non-deterministic data structures to a deterministic data structure.

In one embodiment, the invention provides a method for transforming data structure(s) specifying tree structure(s) in a computing system to modular finite state transducer(s) (MFSTs). The method includes receiving data structure(s) specifying tree structure(s) representing finite state transducer(s) (FSTs) including semantics for defining ordered and unordered information and for any type of finite state machine (FSM) model represented by the data structure(s), the method transforms the data structure(s) to MFSTs while preserving the ordered and unordered information of the data structure(s) in the MFSTs. The transforming includes performing any of an intersection, union and complement operation, or any operations that are reducible to any of intersection, union and complement operations, on the data structure(s). In another aspect of the invention, it can be decided from the result FSM, whether the resulting FSM accepts a non-empty input.

A simplified summary is provided herein to help enable a basic or general understanding of various aspects of exemplary, non-limiting embodiments that follow in the more detailed description and the accompanying drawings. This summary is not intended, however, as an extensive or exhaustive overview. The sole purpose of this summary is to present some high level concepts related to the various exemplary non-limiting embodiments of the invention in a simplified form as a prelude to the more detailed description that follows.

BRIEF DESCRIPTION OF THE DRAWINGS

The techniques for transforming tree grammars for modular finite state transducers, and associated processes, of the invention are further described with reference to the accompanying drawings in which:

FIG. 2A illustrates an exemplary interface provided in connection with a transformation engine of the invention;

FIGS. 2B and 2C illustrate exemplary operation of PushEnvironment and PopEnvironment methods, respectively, provided in accordance with embodiments of the invention.

FIG. 2D illustrates another exemplary interface provided in connection with the transformation engine of the invention;

FIG. 2E lists an exemplary, non-limiting ϵ-closure algorithm as implemented in the transformation framework provided by the invention;

FIG. 2F shows a modification of a subset construction technique to accommodate actions as implemented in the transformation framework provided by the invention;

FIG. 7A illustrates exemplary modeling of an FSM as a state transition table as an exemplary state machine data structure in accordance with the invention;

FIG. 7B illustrates exemplary modeling of an FSM as a state table as an exemplary state machine data structure in accordance with the invention;

DETAILED DESCRIPTION

Figure 1A:
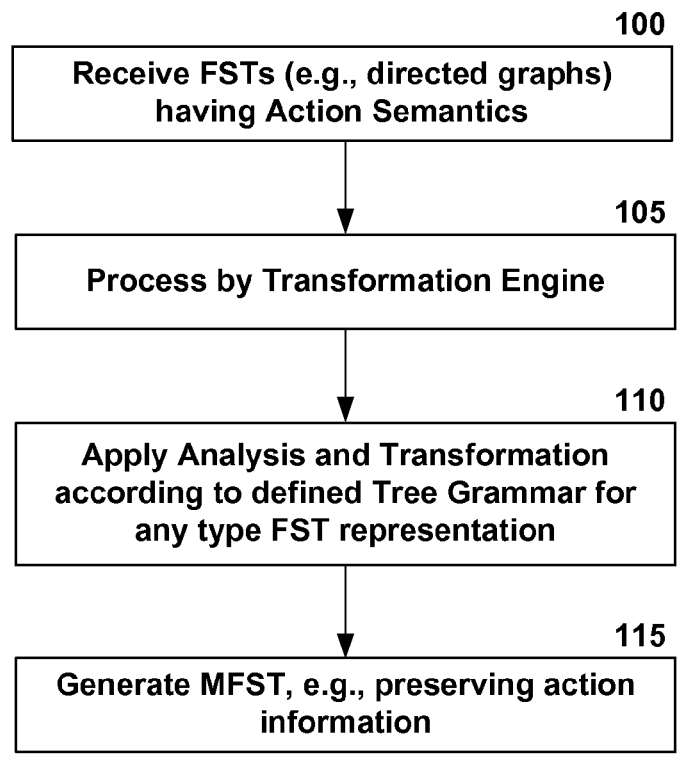
FIG. 1A illustrates an exemplary, non-limiting flow diagram showing an exemplary process for transforming FSTs with a general transformation framework provided by the invention to preserve action semantics.

As mentioned in the background, current frameworks for transforming FSTs and tree data structures, e.g., labeled directed graphs as they tend to be represented in computing memory, are not versatile enough to preserve some types of information when transforming across all types of FSTs. For instance, current frameworks are unable to preserve action semantics of some FSTs, or both ordered and unordered nest information represented by FSTs across a host of types of FSTs.

Accordingly, the invention provides a general framework, termed the Q Framework (or QFX) herein, for performing efficient tree transformation that achieves preservation of action semantics for FSTs that support action information in their representations. The Q framework for performing efficient tree transformation of the invention is also able to preserve ordered and unordered nest information while performing its efficient tree transformation. As will be appreciated from the following description, the QFX also enables a host of other novel aspects relating to transformative capabilities for a defined tree grammar and corresponding translations, transducer diagrams, a transformation engine and operations performed by the transformation engine, translation cases, and determinization including variable renaming, as described in more detail below. In one embodiment of the invention, the invention enables at least intersection, union, complement and emptiness test transforms on tree representations or sets of tree representations.

By way of further introduction, modular finite state transducers (MFSTs) are state machines that implement transformations. In particular, MFSTs are MFAs augmented with program fragments called "actions". Common actions include construction of objects from other objects stored in an environment, binding of variables within an environment, and execution of predicates during pattern-matching.

In this regard, at a high level, the Q Framework (QFX) of the invention enables programmers to define regular tree grammars with actions and to translate these grammars to MFSTs. QFX supports use of any Domain Specific Language (DSL) to define actions. In addition, QFX provides special support for variable-binding actions, yielding a kind of tree grammar called an attributed tree grammar. The following exemplary, non-limiting implementation(s) of the invention describe how QFX is able to compile and execute attributed tree grammars.

In this regard, the compilation approach of the present invention is advantageous for a number of reasons. The compilation approach provides support for high-performance transformation via optimizations and other high-performance approaches. The compilation technique also enables simplification of run-time components so that the production of simple transformation machines can be easily achieved. As will be described in exemplary non-limiting detail below, the compilation techniques described herein also provide a set of clear semantics. In this respect, the compilation approach of the invention makes it easy for programmers to reason about the semantics of a tree grammar, including composition and side-effects.

In general, as shown by the flow diagram of FIG. 1A, the present invention enables a general framework for receiving diverse types of finite state transducers (FSTs) data structures having action semantic information in a computing system at 100, and then applying a transformation engine of the framework at 105 to the FSTs. Then, at 110, analysis and transformation of the FSTs occurs in accordance with a pre-defined tree grammar for any type FST representation, as described in more detail below. As a result, the FSTs are transformed to generate an MFST at 115 that, inter alia, preserves action information of the FSTs, e.g., while performing any of intersection, complement and union operations on two or more FSTs, preserves ordered and unordered nest information, and enables transformation of non-deterministic FSTs into a deterministic result.

Figure 1B:
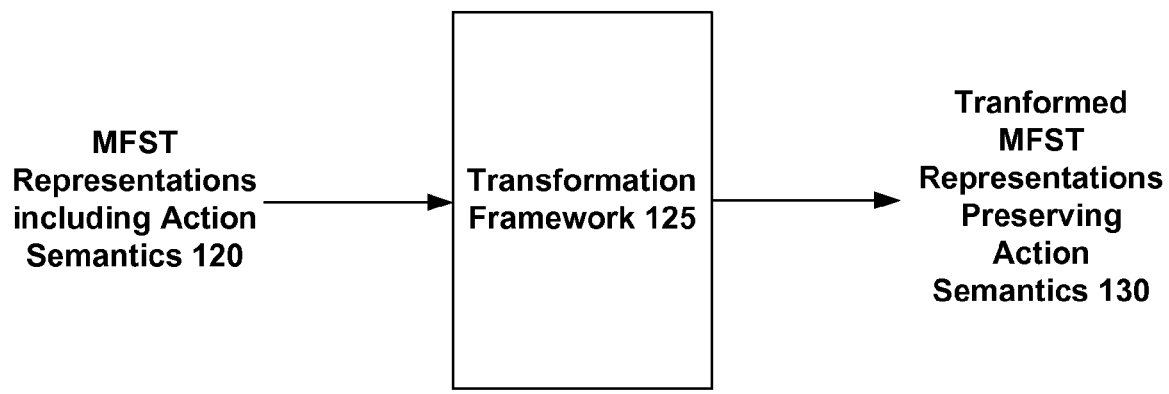
FIG. 1B illustrates an exemplary, non-limiting block diagram showing an exemplary process for transforming FSTs with a general transformation framework provided by the invention to preserve action semantics.

FIG. 1B is a block diagram corresponding generally to the above process illustrating one aspect enabled by the tree grammar of the invention. The transformation framework 125 receives one or more MFSTs 120 including action semantics, transforms the MFSTs according to any of the intersect, union and complement transform operations (and/or other Boolean operators, with composition), and the action semantic information is preserved in the output 130.

Figure 1C:
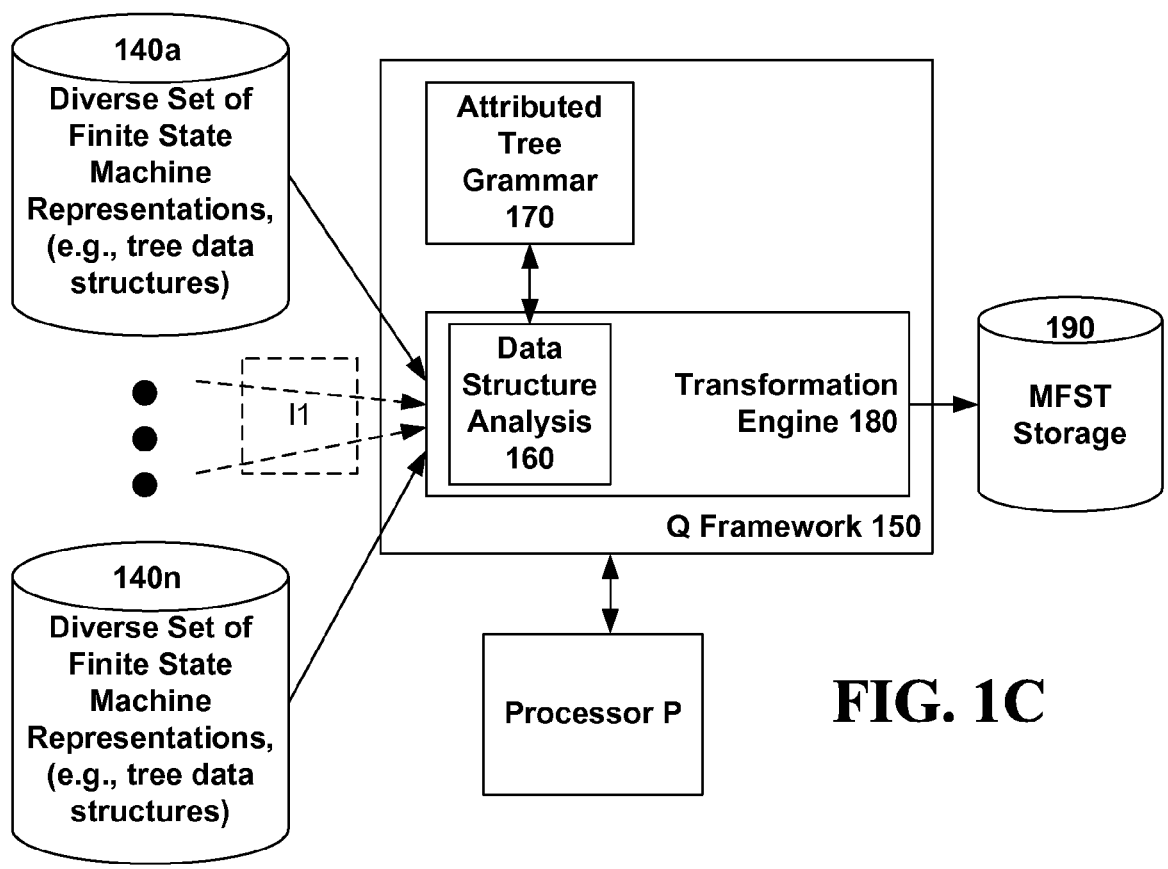
FIG. 1C illustrates an exemplary, non-limiting block diagram showing an exemplary framework and transformation engine for transforming FSTs in accordance with the invention.

FIG. 1C illustrates an exemplary, non-limiting block diagram showing an exemplary framework and transformation engine for transforming FSTs in accordance with the invention. As shown, a variety of kinds of finite state machine representations may be found in a computing system in a variety of storage elements 140a to 140n, wherever found in a computing environment having a processor P for interacting with a Q framework 150 provided in accordance with the invention. In general, the Q framework 150 receives, via a transformation engine 180 for transforming and generating MFSTs 190, subset(s) of finite state machine representations 140a to 140n. The transformation performs an analysis 160 on the subset(s) of finite state machine representations 140a to 140n with reference to an attributed tree grammar 170 in order to determine how to best transduce the subset(s) of finite state machine representations 140a to 140n to MFSTs 190. An interface I1 may also be provided in the computing environment for receiving or defining a directed graph data structure based on and for use with the pre-defined tree grammar 170.

Thus, in various non-limiting embodiments, the invention enables the transformation of tree data structures in a computing system to a modular finite state transducer (MFST). The tree data structures, representing FSMs (e.g., FSTs), include action semantics defining action information pertaining to the FSMs that is preserved through the transformation process. In one embodiment, for any type of FSM model represented by the tree data structures, e.g., directed graph data structures, XML documents, etc., the invention transforms the tree data structures to an MFST while preserving the action information. An extensible, pre-defined translation grammar is implemented by a transformation engine that preserves the action information irrespective of the type of FSM model represented by the tree data structures, preserves both ordered and unordered nest information of the tree data structures and transforms non-deterministic data structures to a deterministic MFST. Advantageously, the invention can handle complements, intersection and union of type of FSM as part of the transformation process.

In further embodiments, the invention includes a Q framework (QFX) including components and software for performing transduction of directed graphs to a modular finite state transducer (MFST) including the ability to analyze directed graph data structures of any type in a computing system and transducer the directed graph data structures to a MFST based on the analysis while preserving action semantics of the directed graph data structures. The QFX performs control flow analysis algorithm(s) on the finite state machines (FSMs) represented by the directed graph data structures in a way that preserves the action semantics information of the directed graph data structures across any type of directed graph representation.

In addition, the QFX includes a transformation engine that performs specialized binding handling in connection with transducing the directed graph data structures. The specialized binding handling includes performing binding for the action semantics information during pattern matching. Furthermore, the transducing includes the ability to in-line at least one transducer definition as defined by a directed graph data structure of the directed graph data structures. Also, the transducing includes compiling variable bindings of the directed graph data structures to slots in the existing activation record and also includes register analysis of the finite state machines (FSMs) represented by the directed graph data structures. A grammar defined by the invention that achieves the above effects and advantages of the invention may be implemented via a software interface, such as a C# interface, that describes directed graph data structures including action semantics information.

In addition, in various embodiments, the invention implements lexical analysis with variable binding. Still further, QFX is extensible, providing efficient interoperability with different transformation providers. Additionally, the invention implements control over the trade-off between compilation and execution performance, i.e., implementations can interpret patterns without expensive compilation, and compile particular patterns for repeated use. Lastly, runtime components can participate in the QFX scheduling discipline by supplying variable-granularity continuation points, enabling use of the same mechanism to supply either single or multiple results.

The following simplified tree grammar syntax of Table I below is an exemplary non-limiting model that may be utilized in connection with compilation processes in accordance with the invention.

TABLE I

Simplified Tree Grammar Syntax

| TreeGrammar | → | Definition+ | |
|---|---|---|---|
| Definition | → | RegexName '=' Choice | |
| Choice | → | Rule ('|' Rule)* | (OR) |
| Rule | → | Action? RuleTerm+ | (ACTION-REGEX) |
| RuleTerm | → | NestedRegex Action? | (REGEX-ACTION) |
| NestedRegex | → | BaseSymbol | (BASE) |
| | | \| VariableBinding? Wildcard | (WILD) |
| | | \| Reference | (REF) |
| | | \| NestedRegex NestedRegex | (SEQUENCE) |
| | | \| VariableBinding? '[' NestedRegex ']' | (BIND-NEST) |
| | | \| VariableBinding? '(' NestedRegex ')' | (BIND-GROUP) |
| | | \| NestedRegex ('+' \| '*' \| '?') | (REPEAT) |
| | | \| NestedRegex 'and' NestedRegex | (AND) |
| Reference | → | VariableBinding? RegexName | (BIND-REF) |
| VariableBinding | → | Variable ':' | |

In the above grammar, an exemplary operator precedence that may be applied is REPEAT>BIND>SEQUENCE>AND>OR. In the description that follows, x is used to represent a variable; b is used to represent a base symbol (a type or a value of a base type); T is used to represent an MFST; a is used to represent an action; and T Ref is used to represent a reference to T.

With respect to the state of the art of translation of regular expressions to NFAs and with respect to the determinization of NFAs, a general review of such translation techniques can be found, for instance, in Aho et al., "Compilers: Principles, Techniques and Tools," Addison-Wesley (1986) or, in Hopcroft et al.'s "Introduction to Automata Theory, Language and Computation," Addison-Wesley (2000). As an improvement on such state of the art techniques, in accordance with the QFX, regular tree grammars defined via the techniques of the invention can be expanded with actions to MFSTs.

Also, the translations discussed in Aho et al. purport to cover the following cases from the above grammar: OR, AND, BASE, SEQUENCE, REPEAT and REF; however, to handle (1) actions, (2) nesting and (3) variable binding according to the invention, translations are desired for the following additional cases, notated as shown in Table II below:

TABLE II

Enhanced Set of Translation Cases Handled by QFX

| α T | (ACTION-REGEX) |
|---|---|
| T α | (REGEX-ACTION) |
| x : [T] | (BIND-NEST) |
| x : [T]*|+|? | (BIND-NEST-REPEAT) |
| x : (T) | (BIND-GROUP) |
| x : [T]*|+|? | (BIND-GROUP-REPEAT) |
| x : T Ref | (BIND-REF) |
| x : T Ref*|+|? | (BIND-REFPEAT) |

The ACTION-REGEX and REGEX-ACTION cases handle compilation of tree grammars with general actions. The BIND-REF, BIND-GROUP, BIND-NEST, BIND-REF-REPEAT, BIND-GROUP-REPEAT, and BIND-NEST-REPEAT cases handle compilation of variable bindings. The BIND-NEST cases also extend regular expressions to nested regular expressions.

Though not shown in the simplified tree grammar syntax of Table I, non-terminal definitions in accordance with the invention may have both regular parameters and type parameters. In one embodiment, the compiler handles regular parameters as inherited attributes and handles type parameters using the BIND-REF and BIND-REF-REPEAT translations.

The transformations to MFSTs in accordance with the invention may be described in exemplary fashion using state machine diagrams that define the MFSTs. In the diagrams, transitions are labeled as follows: b/a where b is the input symbol consumed and a is the action performed. ε/a represents a transition that consumes no input, but performs some action. This class of transition is referred to as an action transition. In executing transducers, in one embodiment of the invention, a maximal progress policy is implemented which assigns a lower priority to the action transitions from a state than all of the input-consuming transitions from that state. In the diagrams, the special symbols '[' and ']' represent the beginning and ending, respectively, of input collections. Variable bindings are written as x=expr and apply to the current environment of the transducer.

For the repetition operators, i.e. '+', '*', and '?', collections of results are accumulated using lists, but the mechanism can be generalized to cover accumulation of results into any collection type, e.g., by using the corresponding join operator.

In accordance with various embodiments of the invention, the BIND-REF and BIND-REF-REPEAT cases are expanded in two ways: inline and call. The inline expansion trades space for time and thus, in one non-limiting implementation of the invention, the inline expansion is preferred when determinizing an MFST. Generally, the call expansion is used in three cases. The first case is when compiling for interpretation. In this case, the compiler does not determinize the MFST and expands all references as calls. The second case is recursion. For instance, if T Ref refers to the start symbol, the compiler expands the reference as a call. The third case is extension. If T Ref refers to an opaque MFST, the compiler expands the reference as a call.

The compiler of the invention translates tree grammars to instructions for a virtual machine called a transformation engine (XE). The XE supports the following: (1) Definition and operation of transducers, (2) Transfer of control to other transformation engine instances and (3) Management of and access to environments.

With respect to the first category, techniques for persisting and interpreting state machine definitions are known. Accordingly, described below are exemplary non-limiting methods for achieving the second and third instruction categories: Transfer and Management. In accordance with the invention, these instructions are defined as methods in a pair of interfaces. The compiler does not generate calls to these interfaces directly; rather, the compiler generates XE instructions that are interpreted by an XE implementation.

An XEControlInstructions interface provided in accordance with the invention is illustrated in the exemplary pseudo-code 200 of FIG. 2A. The XEControlInstructions interface 200 has the current XE instance as an implicit operand, i.e., the 'this pointer' of the XEControlInstructions interface 200.

A Mark method provided in exemplary embodiments of QFX records the current location in the input term on the mark stack. A Yield method pops a mark M off the mark stack and returns the portion of the input term between M and the current location. In one embodiment, QFX implements these methods by indirection through a traversal-provider interface. Such an approach advantageously separates term representation and traversal from term transformation. Traversal providers can thus implement traversal by applying the QFX transformation framework to any particular data representation.

A Call method provided in accordance with the invention creates a new environment E and saves continuation and callingEnvironment in E (see, e.g., XEControlInstructions interface 200 of FIG. 2A). The Call method then returns a continuation that transfers control to target. The Call method also calls the Mark method to save the current input location. A Return method inverts this operation and operates to save the matched term in the current environment (E) using the Yield method: E.term=Yield( ). Then, the Return method stores E in the variable callingEnvironment.result; finally, the Return method returns continuation. When called, continuation sets the current environment to callingEnvironment and continues from the calling state.

A NewEnvironment method creates a new environment in accordance with the invention. In addition, the exemplary non-limiting pseudo-code 210 and pseudo-code 220 of FIGS. 2B and 2C outline the operation of PushEnvironment and PopEnvironment methods, respectively.

The PushEnvironment method saves the current environment on an internal environment stack and creates a new environment, e.g., named tempEnv. PushEnvironment then binds tempEnv to variableName, sets the current environment to tempEnv and calls Mark to record the current input location.

The PopEnvironment method records in the variable "term" the sub-term matched since the preceding Mark call. PopEnvironment then restores the current environment from the environment stack. PopEnvironment does not save the popped environment because the corresponding call to PushEnvironment has already bound the popped environment.

Additionally, an Exec method executes an action in accordance with the invention. In an exemplary implementation of QFX, an ActionReference is a table index corresponding to a separately persisted and loaded table of method pointers.

An XEEnvironmentInstructions interface provided in accordance with the invention is illustrated in the exemplary pseudocode 230 of FIG. 2D. The XEEnvironmentInstructions interface 230 has an environment instance as an explicit operand, i.e., the 'this pointer' of the XEEnvironmentInstructions interface 230.

A ChildEnv method creates a new nested environment whose parent is 'this' of the this pointer. A Bind method binds a variable to a value, returning true if the binding succeeds. In an exemplary, non-limiting embodiment, if variableName has a current binding, the Lookup method sets value to that binding and returns true. Otherwise, it returns false.

Operation of the transformation engine (XE) of the invention supports assignment of priorities to state transitions. The compiler addresses ambiguity arising from choices among patterns by ordering the transitions possible on each state. In one non-limiting embodiment, all transitions on normal input take precedence over wildcard transitions, which take precedence over action transitions. Also, within these precedence groups, the programmer may optionally assign priorities to particular transitions.

XE instances may address generation of multiple results by supporting a mode in which they use all applicable transitions to continue from a state, queuing continuations in priority order.

Figure 3A:
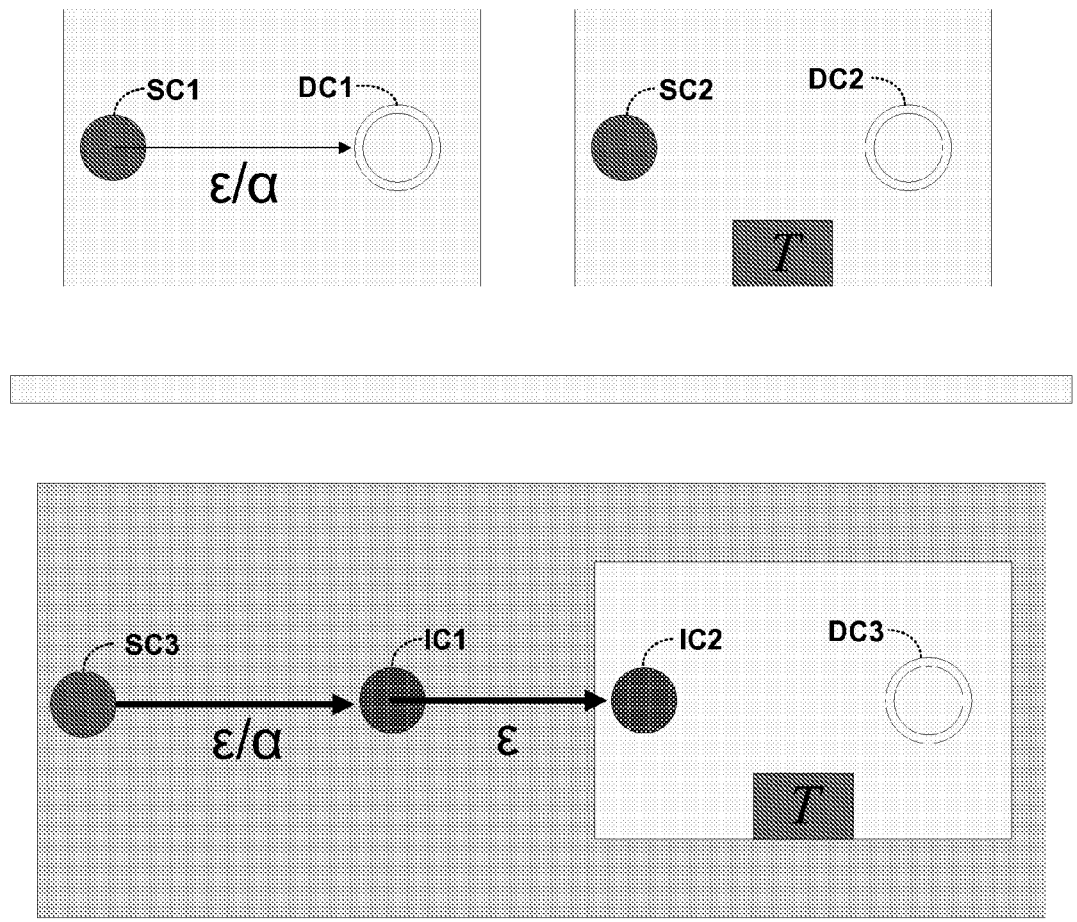
FIG. 3A illustrates exemplary translation of the ACTION-REGEX case, or a T case, of the enhanced set of translation cases defined in accordance with the invention.

FIG. 3A illustrates exemplary translation of the a T case of the enhanced set of translation cases defined in accordance with the invention. More specifically, FIG. 3A shows the translation of the ACTION-REGEX case. This translation is an application of the translation for the NestedRegex SEQUENCE case. The REGEX-ACTION case is not shown as it is a straightforward application of the SEQUENCE translation. In the diagrams, circles SC1, SC2 and SC3 represent the start states, circles IC1, IC2 and IC3 represent intermediate states and double circles DC1, DC2 and DC3 represent accepting states.

Figure 3B:
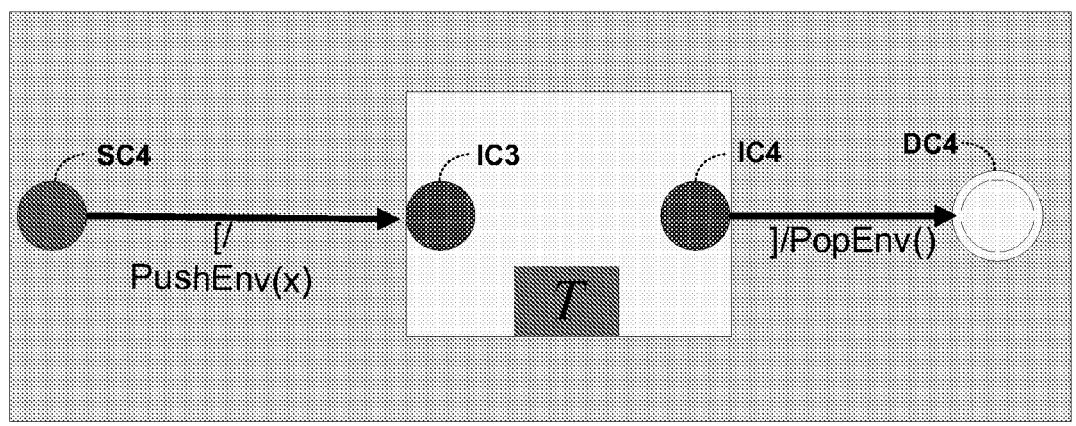
FIG. 3B illustrates exemplary translation of the BIND-NEST case, or x: [T] case, of the enhanced set of translation cases defined in accordance with the invention.

FIG. 3B illustrates exemplary translation of the BIND-NEST case, x [T]. In FIG. 3B, the methods PushEnvironment and PopEnvironment are abbreviated PushEnv and PopEnv respectively. Start state SC4, intermediate states IS3 and IS4 and accepting state DC4 show different states of the machine defined by FIG. 3B. Upon reading a [, the machine creates a new environment E and binds it to x. The machine then pushes the current environment C and makes E the current environment. The machine also marks the current input location. Then, the machine executes T, binding variables in E. During the execution of T, variable bindings accumulate in E. The machine then stores in E.term the term matched by [T] and restores C as the current environment.

Figure 3C:
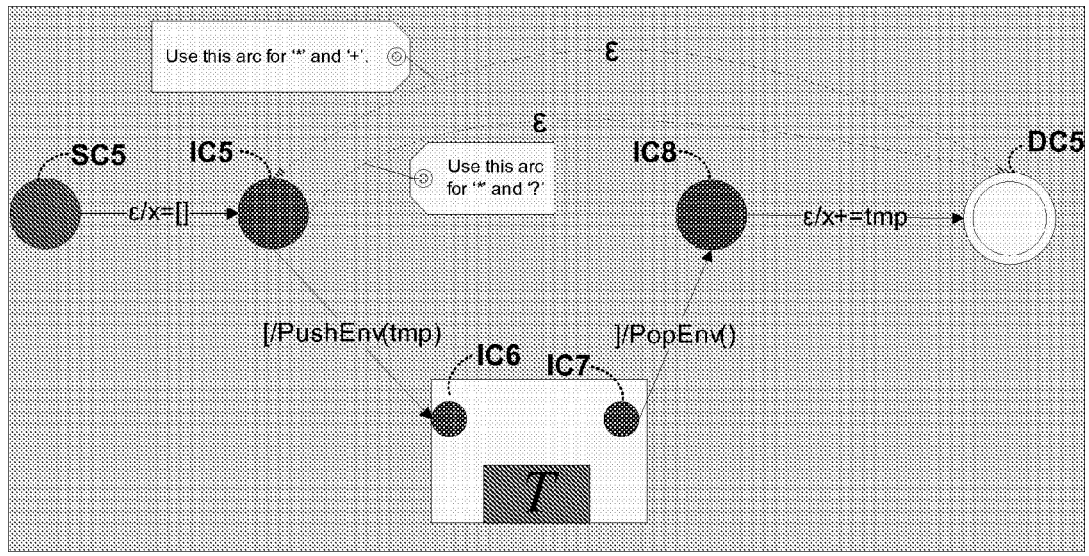
FIG. 3C illustrates exemplary translation of the BIND-NEST-REPEAT case, or x: [T]*|+|? case, of the enhanced set of translation cases defined in accordance with the invention.

FIG. 3C illustrates exemplary translation of the BIND-NEST-REPEAT case, x: [T]*|+|?. FIG. 3C shows how the compiler translates nested regular expressions with repetition. Start state SC5, intermediate states IS5, IS6, IS7 and IS8 and accepting state DC5 show different states of the machine defined by FIG. 3C. One can see that the inner portion of the transducer defined by states IS5, IS6, IS7 and IS8 is identical to the machine in FIG. 3B. Surrounding this machine is a container state machine including start state SC5 and accepting state DC5. The goal of the container machine is to accumulate environments as a list bound to the variable x.

In this regard, first, the transducer creates an empty list and binds it to x. Next, the transducer appends the result of executing a [T] to x. The execution and append steps are rendered optional by the forward ε transition marked "Use this arc for '*' and '?'. The execution and append steps may be optionally repeated by traversal of the backward ε transition marked "Use this arc for '*' and '+'.

Figure 3D:
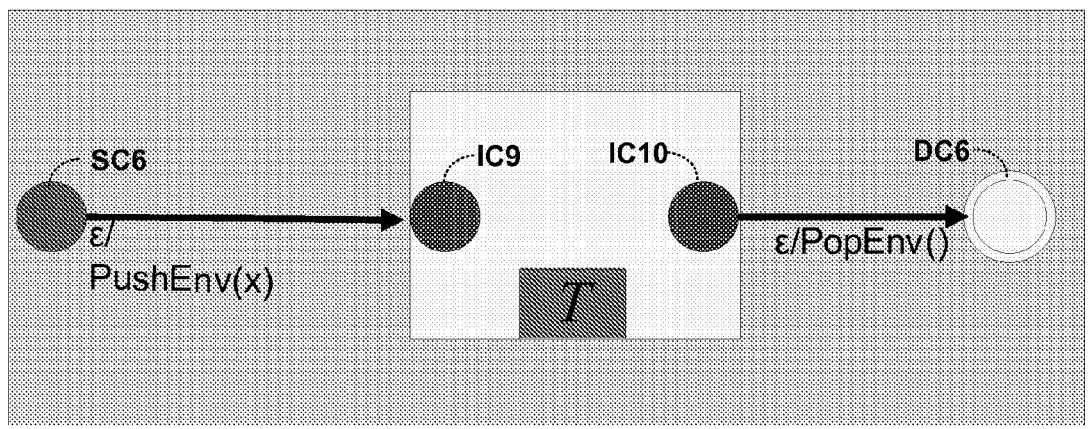
FIG. 3D illustrates exemplary translation of the x: (T) case of the enhanced set of translation cases defined in accordance with the invention.

FIG. 3D illustrates exemplary translation of the x: (T) case. Start state SC6, intermediate states IS9 and IS10 and accepting state DC6 show different states of the machine defined by FIG. 3D. FIG. 3D shows a transducer that is similar to the transducer for the BIND-NEST case of FIG. 3B, except that the transitions into and out of T in FIG. 3D do not consume an input symbol.

Figure 3E:
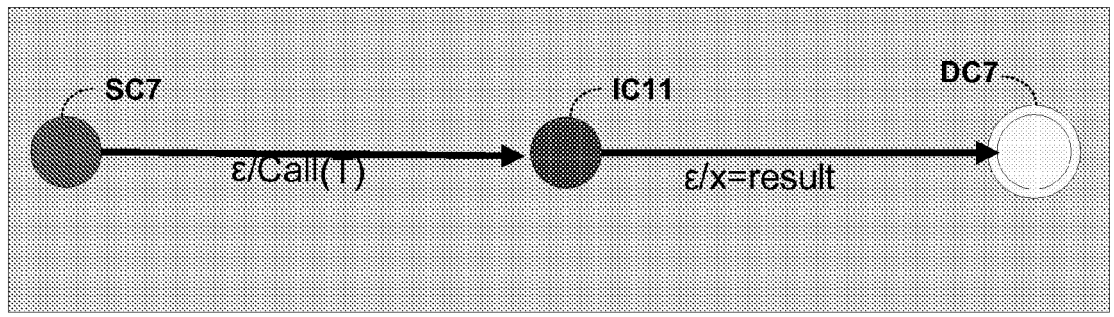
FIG. 3E illustrates exemplary translation of the x: T Ref case, expansion using call, of the enhanced set of translation cases defined in accordance with the invention.

FIG. 3E illustrates exemplary translation of the x: T Ref case, expansion using call. FIG. 3E defines a machine including start state SC7, intermediate state IS11 and accepting state DC7 and shows use of the call strategy to expand x: T Ref. The first transition executes a call instruction Call(T) which is a shorthand for the following exemplary, non-limiting pseudo-code:

Call(T, CurrentContinuation, CurrentEnvironment)

The CurrentContinuation at the point of the call is the intermediate state IS11 at the end of the transition arrow. The called transducer returns its environment in the variable result. Finally, the calling transducer binds the result to x.

Figure 3F:
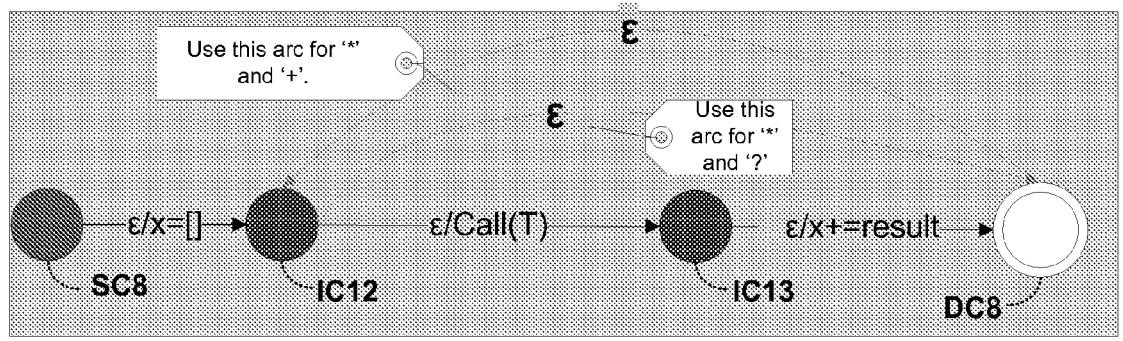
FIG. 3F illustrates exemplary translation of the x: T Ref*|+|? case, expansion using call, of the enhanced set of translation cases defined in accordance with the invention.

FIG. 3F illustrates exemplary translation of the x: T Ref*|+ |? case, expansion using call. FIG. 3F defines a machine including start state SC8, intermediate states IS12 and IS13 and accepting state DC8 and shows the repetition container applied to a call. This transducer is similar to the transducer of FIG. 3C, with a call to T as the inner transducer in place of an inline expansion of T.

The translation cases not described so far in FIGS. 3A to 3F are BIND-GROUP-REPEAT and the inline version of the BIND-REF cases. BIND-GROUP-REPEAT combines the repetition container of FIG. 3F with the transducer for BIND-GROUP shown in FIG. 3D. Additionally, the inline versions of the BIND-REF and BIND-REFREPEAT cases are identical to the BIND-GROUP and BIND-GROUP-REPEAT cases, respectively.

Determinization describes how subset construction techniques can be formulated to account for transitions that may have actions in accordance with the invention. In accordance with the invention, association of actions with both transitions and states is enabled. While deterministic transducers may be constructed with actions only on transitions, that choice makes the algorithms more complex, whereas it is straightforward to efficiently to store actions for both states and transitions.

Simplifying some details, FIG. 2E lists an exemplary, non-limiting ε-closure algorithm as implemented in QFX, i.e., State⟨T⟩EClosure+. The method is augmented to accumulate actions on E transitions. The lines marked (A1) and (A2) in the exemplary pseudo-code 240 of FIG. 2E save in the list 'actions' all actions on epsilon transitions traversed during the ε-closure construction. The overall determinization algorithm transfers these saved actions to the deterministic finite state transducer (DFST) state constructed from the ε-closure.

FIG. 2F shows the subset construction modified to accommodate actions as implemented in exemplary fashion in QFX, i.e., NFA⟨T⟩SubsetConstruction. Labels (B1) through (B6) mark lines of the exemplary pseudo-code 250 of FIG. 2F modified or added to accommodate actions. Lines (B1) and (B2) find all of the states to which the source state (src) has a transition on symbol; these lines also accumulate in symActions the actions of each transition. Lines (B3) and (B4) perform a similar function for the ε transitions. Finally, line (B5) adds symActions to the DFST transition between the src and dst states and line (B6) adds epsActions to the src state. These actions are then performed upon completed transition to src. In one embodiment, these algorithms assume that actions do not have side-effects other than the binding of variables in the current environment.

Overall, advantageously, this method for determinization in accordance with the invention achieves the following guarantees:

1. If a pair of actions a1 and a2 are elements of same production, actions a1 and a2 are invoked in lexical order;

2. If action a1 is part of production p1 and action a2 is part of production p2, with p1≠p2, then the transducer will invoke either a1 or a2. The transducer may only invoke both actions in the case that p1 and p2 share a prefix pre, and that pre contains a1 in p1 and pre contains a2 in p2; and 3. Within the starting definition for a grammar, the final action of each production may have side effects. In one embodiment, the transducer does not run this action until all other actions have completed.

In this respect, attributed tree grammars enable programmers to take advantage of the above guarantees. Using attribute grammars, a programmer can express all actions as variable bindings within the current environment. Such actions can take one of two forms: either x: T or x=expression, where expression may read values from the current environment or invoke code to compute a value. As long as the code executed by an expression does not introduce ordering dependencies, the result of executing a tree grammar is deterministic.

Programmers can use attribute grammars to defer side effects until it is unambiguous that the side effect should be invoked. For example, to traverse a tree printing text, a programmer could gather the text into a string using attributes and then print the string from the final action associated with the tree grammar's start symbol. The programmer could also choose to print sub-trees "on the fly" by deferring print actions to unambiguous non-terminal definitions.

With respect to variable renaming in accordance with exemplary, non-limiting embodiments of the invention, to ensure the independence of variable-binding actions, the compiler renames variables so that each variable bound in an MFST is unique. If the compiler is also generating code for a given action, the compiler renames variables in a as well. If a code block B is opaque to the compiler, the compiler arranges to pass to B an environment that looks up the original variable names indirectly through their updated names.

Optionally, the variable renaming can be optimized by performing live range analysis and having several original variables share the same updated name. Also, transducer performance may be improved by implementing variable reference as array access using a compiler-determined offset.

Accordingly, in one aspect, the invention provides a general framework for performing efficient tree transformation that achieves preservation of action semantics for FSTs that support action information in their representations across a diverse set of representations of FSTs. Any of the intersection, union and complement transformation operations, and other Boolean operators with composition, can be performed on FSTs while preserving action semantics.

In addition, as mentioned in the background, under limited circumstances, there are some systems that can preserve ordered nest information across tree transforms and some systems that can preserve unordered nest information across tree transforms, but there are no systems yet that can preserve both ordered and unordered tree information across tree transforms, e.g., intersection, union, complement, etc. Accordingly, in various non-limiting embodiments, the framework for performing efficient tree transformation also preserves ordered and unordered nest information while performing tree transformations for FSTs.

Figure 4A:
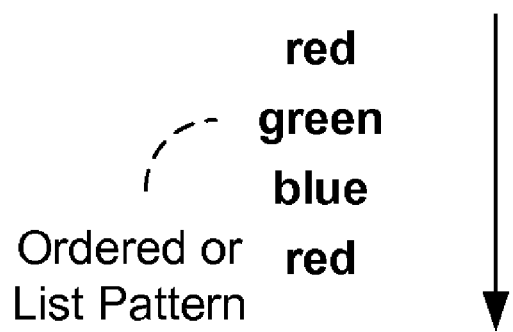
FIGS. 4A and 4B conceptually illustrate ordered, or list, patterns and unordered, or set, patterns, respectively, in connection with which the QFX of the invention which operates to preserve both ordered and unordered nest information across transforms for FSTs.
Figure 4B:
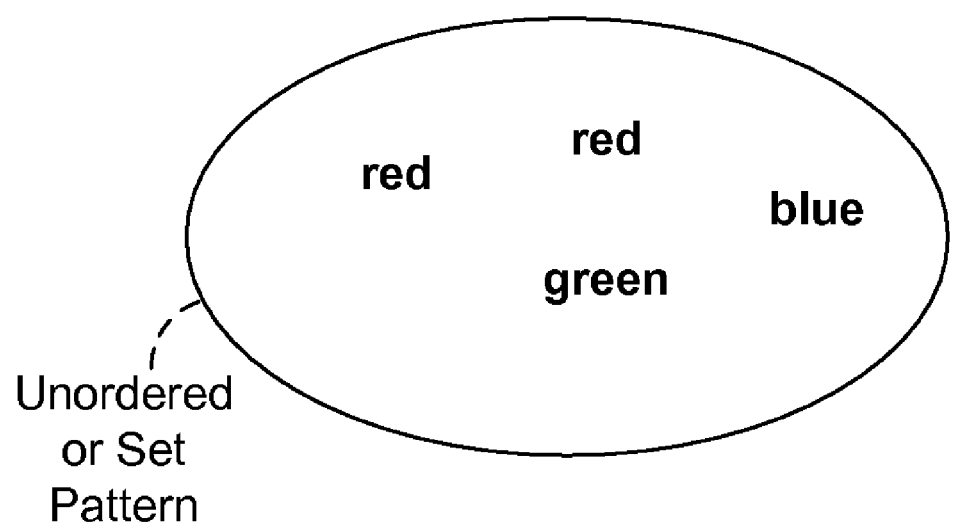

The distinction between ordered and unordered information is conceptually illustrated in FIGS. 4A and 4B. FIG. 4A shows an ordered pattern, also known as a list pattern, which requires the sequence of red, then green, then blue, then red again in order to match the pattern. In a pattern matching sense, therefore, the order in which the elements of the pattern appear is taken into account. FIG. 4B shows an unordered pattern, which is also known as a set pattern. The set pattern of FIG. 4B shows the same elements as the list pattern of FIG. 4A, but this time, without any order. The set pattern of FIG. 4B thus represents a set of two reds, one green, and one blue in any order whatsoever. It is the occurrence of the elements in the set that is taken into account when pattern matching, i.e., whether the elements appear in both trees, not in what order the elements appear.

An example of a list pattern matching scenario in a computing system might be the entry of a password, wherein the password is a sequential set of numerals. Since each character entered for the password must be entered in a specific order in order to match against the correct password stored in the system for the user, the password matching scenario will match patterns based on a tree structure having ordered information.

An example of a set pattern matching scenario in a computing system might be searching for a set of specified files, e.g., Pic_Amy, Pic_Greg, Pic_Neyda, in a file system. When searching for the folder in which these pictures appear, what is being matched is their occurrence, not in what order they appear, in the folder. In other words, the user in the search scenario only cares to find a folder having each of these files, and the order in which the pictures were stored in the system is unimportant to the user. Another example of a set pattern matching scenario is finding a certain first, middle and last name together in a database, where the result does not depend on whether the data was stored as "last name, first name, middle name," "first name, middle name, last name" or "first name, last name, middle name." Any occurrence of all three in any order satisfies the database query.

In accordance with the framework of the invention, transformations can be performed on MFSTs while preserving both ordered and unordered information represented by the tree data structures including any of intersect, union and complement transformations. Transformations can thus be performed on patterns that combine set and list assumptions about children of the tree. Thus, either ordered or unordered information that is nested in the nodes of the tree structures is preserved across transformations.

Figure 5A:
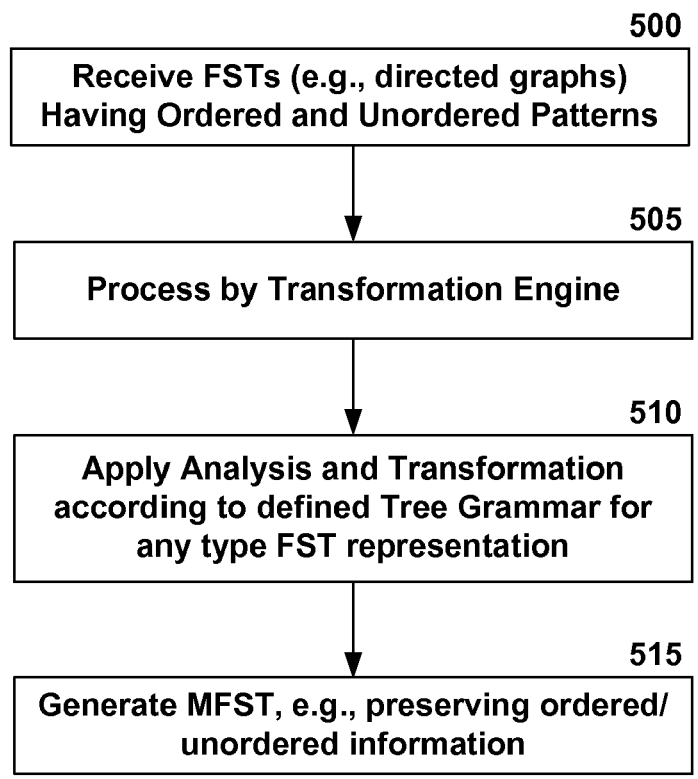
FIG. 5A illustrates an exemplary, non-limiting flow diagram showing an exemplary process for transforming FSTs with a general transformation framework provided by the invention to preserve ordered and/or unordered information.

As shown by the flow diagram of FIG. 5A, the present invention enables a general framework for receiving diverse types of finite state transducers (FSTs) data structures including ordered and/or unordered information in a computing system at 500, and then applying a transformation engine of the framework of the invention at 505 to the FSTs. At 510, analysis and transformation of the FSTs occurs in accordance with the above-described tree grammar for any type FST representation. As a result, the FSTs are transformed to generate an MFST at 515 that preserves action information of the FSTs, e.g., while performing any of intersection, complement and union operations on two or more FSTs, preserves ordered and unordered nest information, and enables transformation of non-deterministic FSTs into a deterministic result.

Figure 5B:
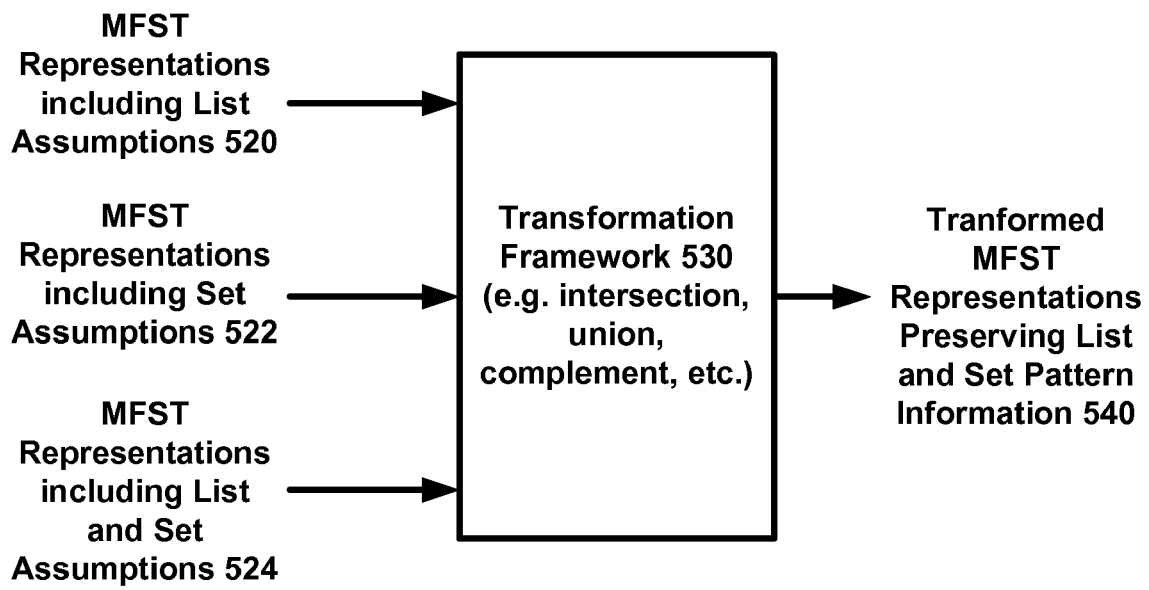
FIG. 5B illustrates an exemplary, non-limiting block diagram showing an exemplary process for transforming FSTs with a general transformation framework provided by the invention to preserve ordered and/or unordered information.
Figure 5C:
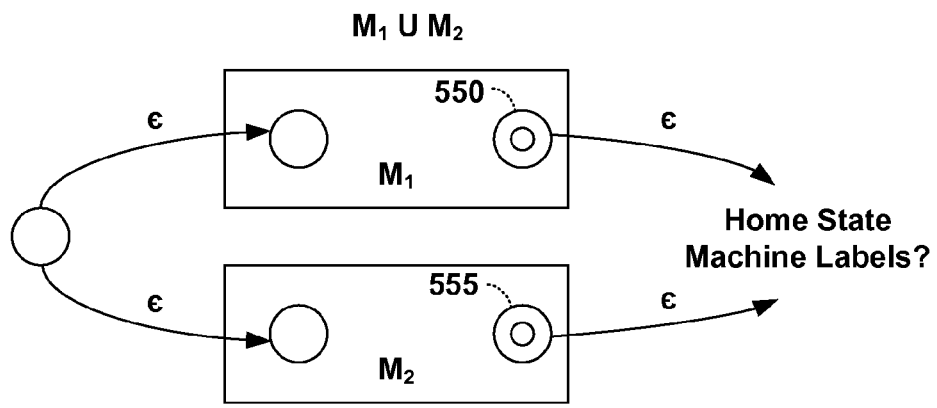
FIGS. 5C to 5L illustrate exemplary, non-limiting aspects of transformations on state machines in the presence of ordered, or labeled information in accordance with the invention.

FIG. 5B is a block diagram corresponding generally to the above process illustrating this aspect enabled by the tree grammar of the invention. The transformation framework 530 receives one or more MFSTs 520, 522 or 524 including ordered information, unordered information, or both, respectively, transforms the MFSTs according to any of the intersect, union and complement transform operations (and/or other Boolean operators, with composition), and the ordered and/or unordered information is preserved in the output 540.

FIGS. 5C to 5I illustrate exemplary, non-limiting aspects of transformations on state machines in the presence of ordered, or labeled information. As shown in the block diagram of FIG. 5C, the issue relates to the union of two state machines $M_1$ and $M_2$, having separate accept states 550 and 555 for the respective machines $M_1$ and $M_2$, i.e., how to represent this information in the transform representation of the machines. In the past, this has been accomplished by combining the two accept states 550 and 555 into a single accept state representing both, which can result in loss of information from the original machines.

Figure 5D:
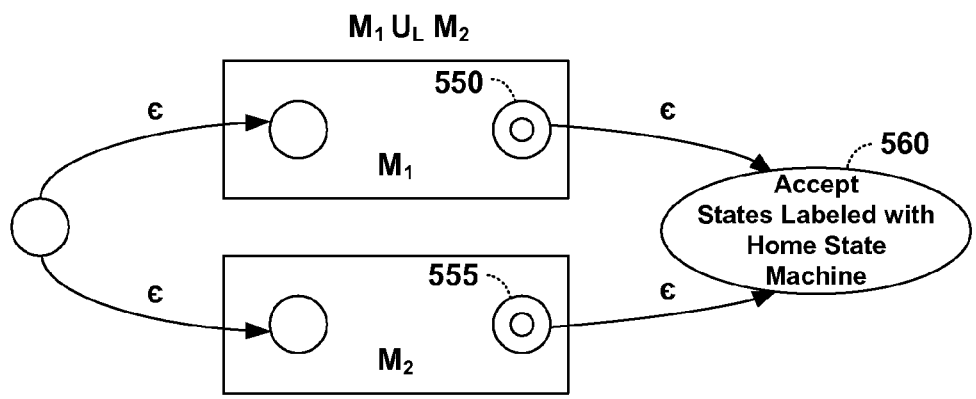

In accordance with the block diagram of FIG. 5D, in an exemplary non-limiting aspect, the invention accepts home state machine labeled accept states in a resultant transform machine 560. In various non-limiting embodiments, the invention introduces the handling of a labeled union $U_L$ during transformation, which is a variant of union that labels the accept states of the union machine with the name of the machine from which the accept state originates.

Figure 5E:
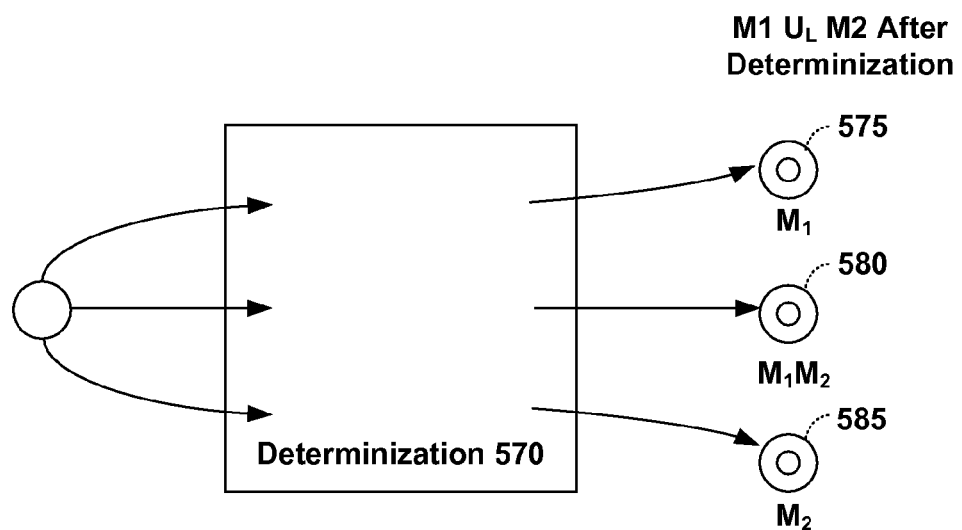

As illustrated by the example of FIG. 5E, when performing $M_1 \ U_L \ M_2$, then there are three possibilities for accept state labels: "$M_1$" 575, "$M_1, M_2$" 580 and "$M_2$" 585. These indicate that the accept state in the labeled union machine represents an input that would be accepted by M1, both M2 and M2, and M2, respectively. As shown in greater detail in FIG. 5I, in an exemplary non-limiting implementation, these labels can be viewed as bits, one bit per original machine. For example, $M_1$ could be assigned the low bit and $M_2$ could be assigned the high bit. Then, the possible labels can be represented as "01" (i.e., $M_1$ but not $M_2$ would accept the input), "11" (i.e., both $M_1$ and $M_2$ would accept the input) and "10" (i.e., $M_2$ but not $M_1$ would accept the input). The other possibility is "00." All non-accept states of the union machine can be viewed as having this label (because neither $M_1$ nor $M_2$ would accept the input).

Figure 5F:
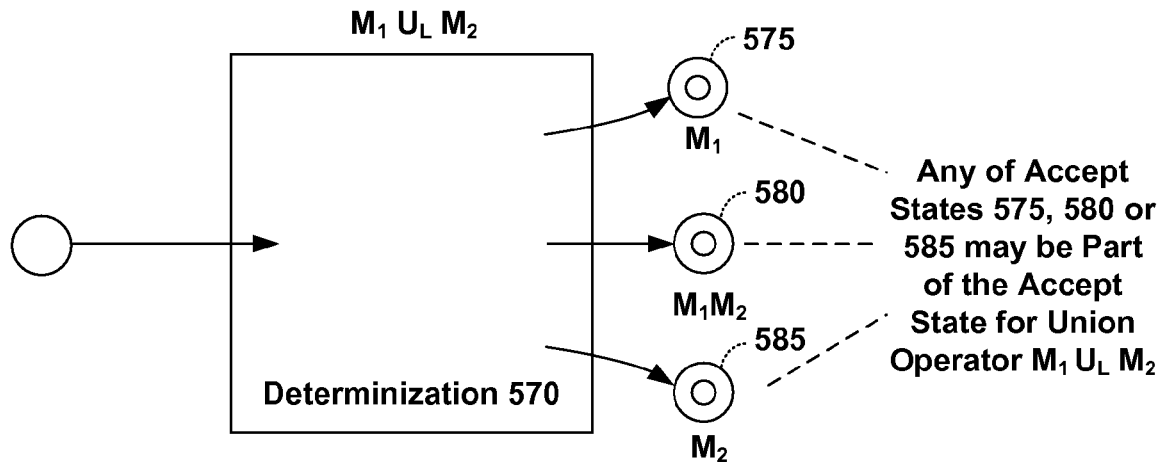
Figure 5G:
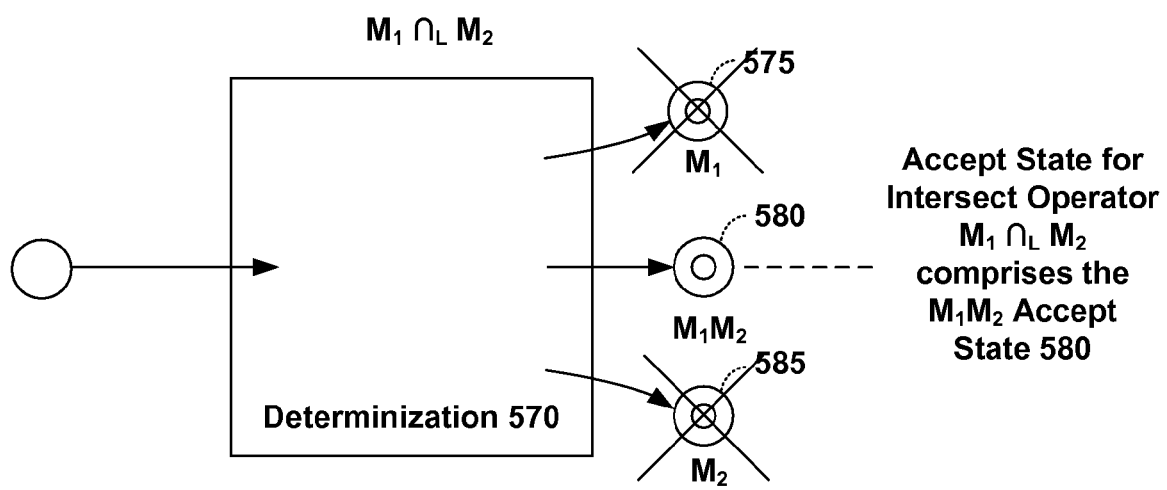

In this regard, as shown in the block diagram of FIG. 5E, in addition to generating a resultant accept state node 580 that represents the combination $M_1 M_2$, the invention also generates accept state nodes 575 and 585 representing an accept state $M_1$ and an accept state $M_2$. As shown in FIG. 5F, any of these accept states 575, 580 and/or 585 may be part of the resulting Accept State when the union operator $M_1 \cup M_2$ is encountered, whereas, as shown in FIG. 5G, the intersect operator $M_1 \cap M_2$ implicates just the $M_1 M_2$ node 580. For instance, where $M_1$ is assigned the low bit and $M_2$ is assigned the high bit, in one non-limiting embodiment, the union machine is converted into an intersection machine by finding the accept states labeled "11." If there are none, the intersection machine is empty. Given a set of states A that are labeled "11," the intersection machine is generated by removing from the union machine any states from which no state in A can be reached.

Figure 5H:
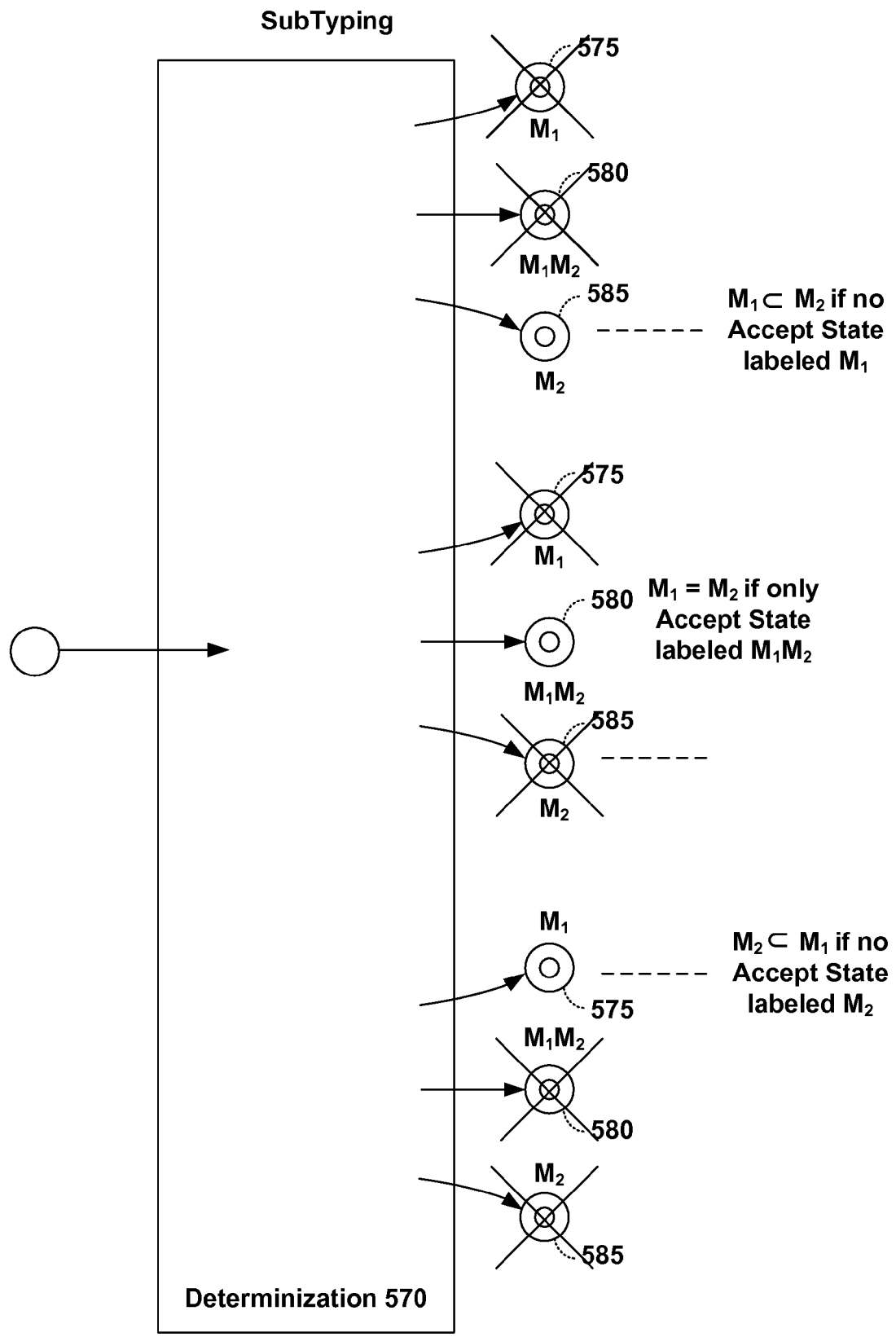

Subtyping can also be captured during transformation in accordance with the invention as shown illustrated by the block diagram of FIG. 5H. There are three results that may be determined when determinizing with component 570 with respect to typing. $M_1 \subset M_2$ is one result if no Accept State is labeled $M_1$, as shown at the top. $M_1 = M_2$ is another result if only Accept State $M_1 M_2$ 580 is generated in the middle. $M_2 \subset M_1$ is another result if no Accept State is labeled $M_2$, as shown at the bottom. Given the above transformation processes, subtyping can be determined. For instance, where $M_1$ is assigned the low bit and $M_2$ is assigned the high bit, if all accept states are labeled 11, then $M_1$ is equal to M2. If there are accept states labeled 10 and 11, then $M_2$ contains $M_1$ (i.e., $M_1$ is a subtype of $M_2$).

Figure 5I:
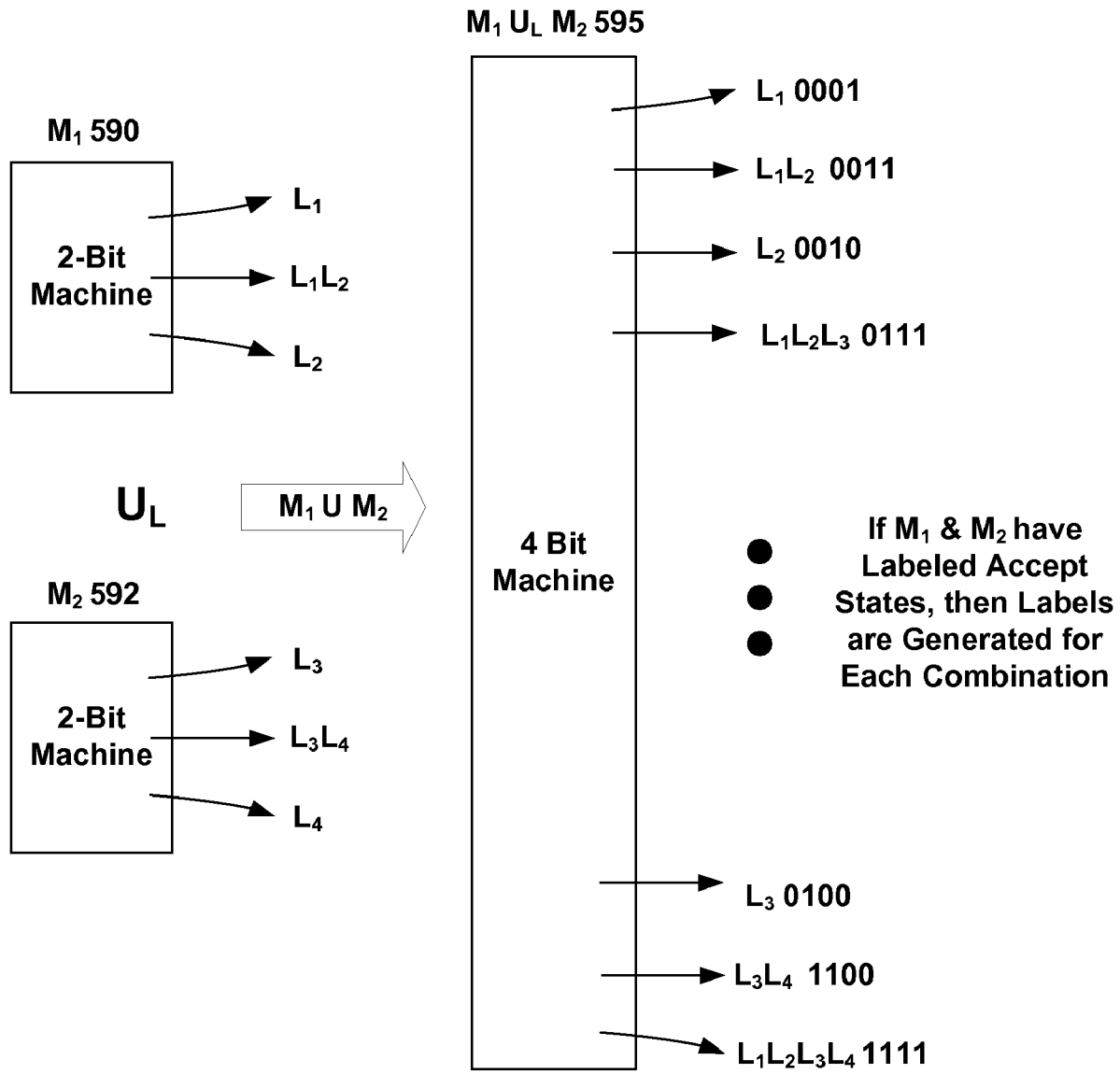

FIG. 5I illustrates a flow diagram for an exemplary non-limiting process of transforming a machine 590 and machine 592 according to the labeled union operator, wherein each of the two machines 590 and 592 are two-bit machines. In accordance with the above-described exemplary non-limiting implementation that applies bit labels, two bits are assigned to labels $L_1$ and $L_2$ of machine 590 and two bits are assigned to labels $L_3$ and $L_4$ of machine 592. When combined according to the labeled union operator of the invention, this produces 16 accept states in a resultant 4-bit machine 595. For instance, $L_2$ will receive label 0010, $L_2L_4$ receives label 1010 and $L_1L_2L_3L_4$ receives label 1111, and so on, until all of the combinations are represented.

Figure 5J:
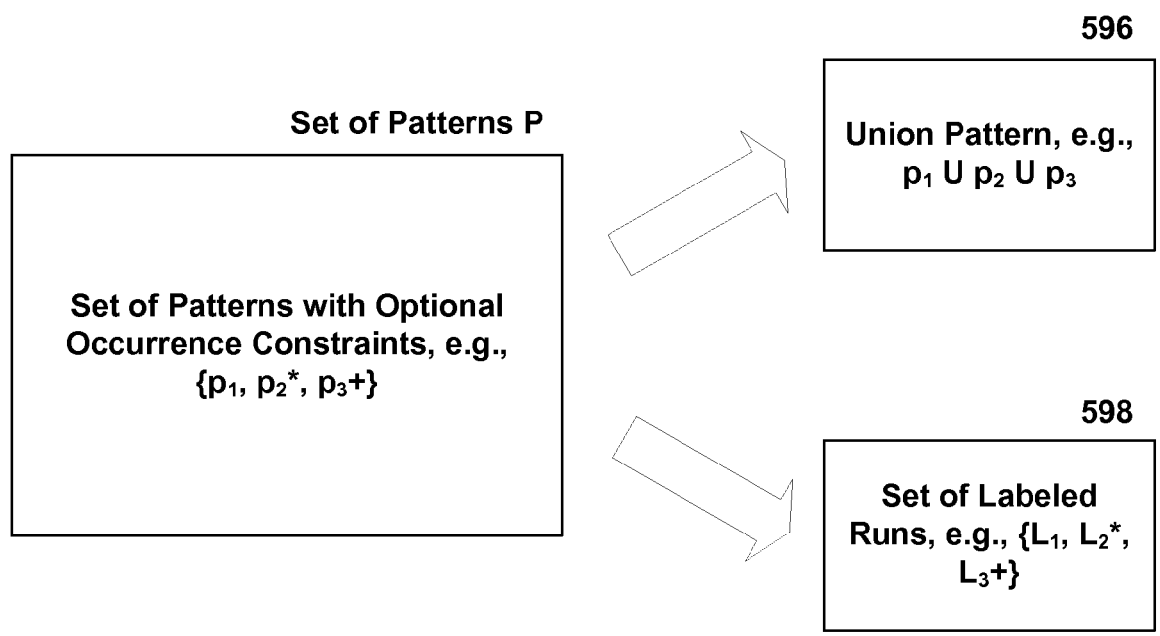

FIG. 5J illustrates how to transform ordered machine(s) to build and combine corresponding unordered machine(s). For instance, a set of patterns P may include optional occurrence constraints, such as represented by the following set $\{p_1, p_2^*, p_3^+\}$, which indicates a set including at least one $p_1$, a set including zero or more one $p_2$, and one ore more $p_3$. In accordance with exemplary, non-limiting implementations of the invention, set patterns P are broken into two constituent parts: (A) a union pattern 596 such as $p_1 \cup p_2 \cup p_3$ in the presently described example set P and (B) a set of labeled runs 598, each of which accepts some inputs. In the presently described example, this might may result in $\{L_1, L_2^*, L_3^+\}$, where $L_1$, $L_2$ and $L_3$ label the accept states of $p_1$, $p_2$ and $p_3$, respectively.

Figure 5K:
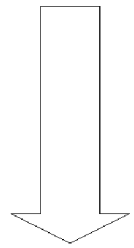
Figure 5K:
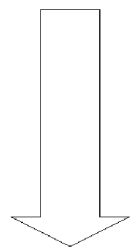

Accordingly, as shown by FIG. 5K, to perform a labeled union $U_L$ for unordered patterns, e.g., given unordered patterns $P_1$ and $P_2$, in accordance with exemplary, non-limiting implementations of the invention, the following expressions are computed: $\cup(P_1)$, $\cup(P_2)$, $\Gamma(P_1)$ and $\Gamma(P_2)$, where $\cup(x)$ is the union pattern for x, and $\Gamma(x)$ is the set of accepting runs for x. Then, based on these expressions, the following two results are obtained:

$$\cup(P_1 \cup_L P_2) = \cup(P_1) \cup_L \cup(P_2) \quad (1)$$

$$\Gamma(P_1 \cup_L P_2) = \Gamma(P_1) * \Gamma(P_2) \quad (2)$$

wherein the "*" operator LUCP of FIG. 5K and in equation (2) above represents a labeled union cross product operation.

Figure 5L:
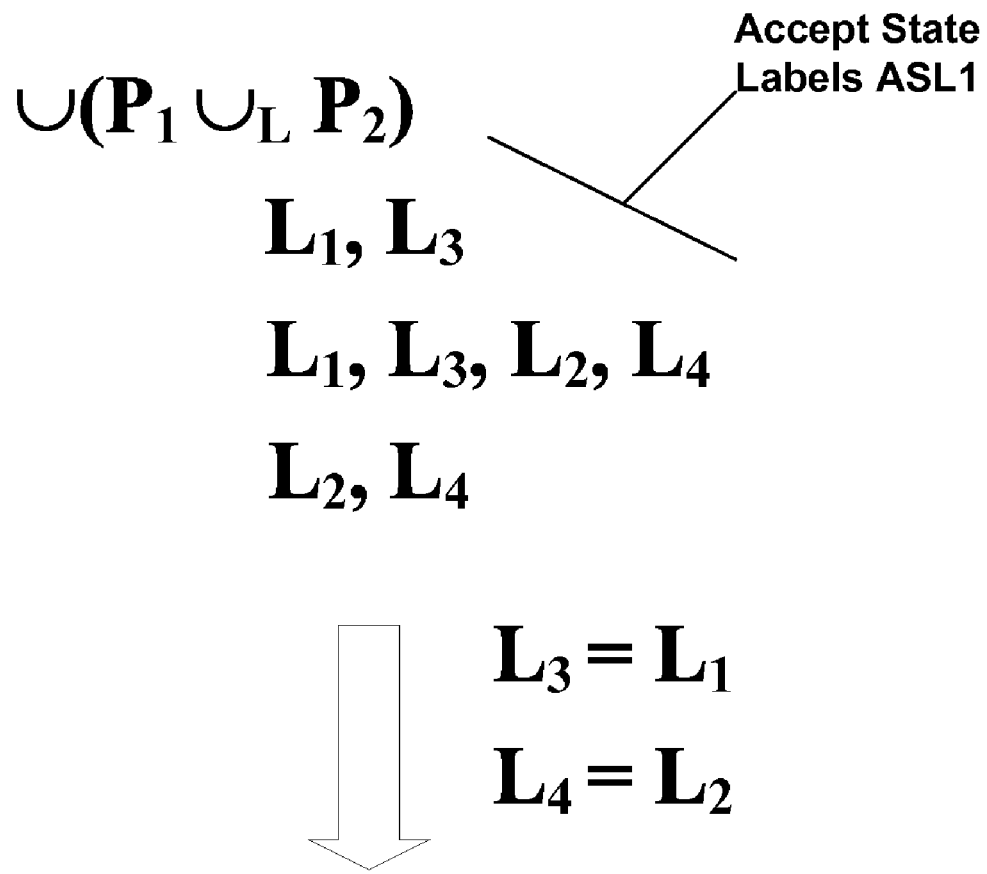
Figure 5L:
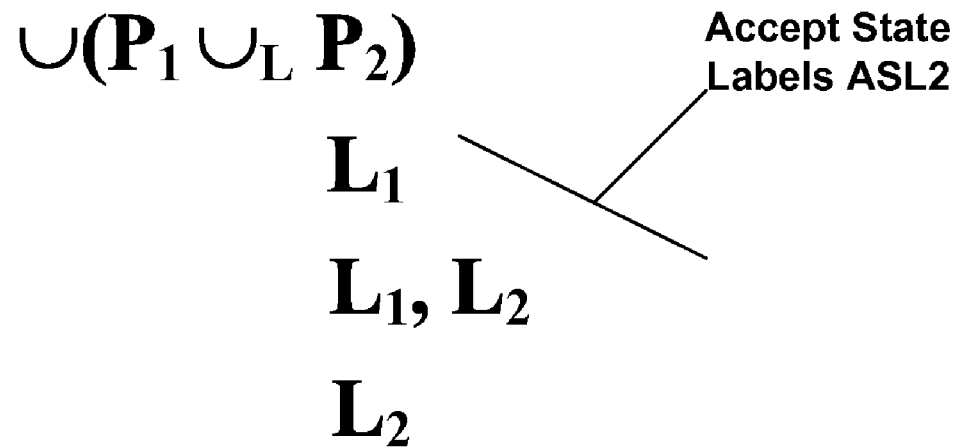

Next, $\cup(P_1 \cup_L P_2)$ is re-labeled so that run labeling is consistent. For instance, re-labeling is achieved by re-writing every l in a group of redundant labels R. From R, an arbitrary member z (e.g., the lowest-numbered label or the lowest-ordered bit in the above-described bit per label implementation) is selected, and l is re-written to z for each l in R. For instance, as shown in FIG. 5L, where $\cup(P_1 \cup_L P_2)$ has exemplary accept state labels ASL1 including "$L_1, L_2$", "$L_1, L_3, L_4$", "$L_2$" and "$L_2, L_4$", then $L_3$ can be replaced by $L_1$ and $L_4$ can be replaced by $L_2$ to form condensed accept state labels ASL2, i.e., "$L_1$", "$L_1, L_2$" and "$L_2$".

As mentioned, the "*" operator LUCP of FIG. 5K and in equation (2) above represents a labeled union cross product operation. Having re-labeled the accepting runs of $P_1$ and $P_2$ as described in the previous paragraph, the labeled union cross product operation can be defined according to the following non-limiting process. First, the operator $U_L$ is defined for a pair of runs $R_1$ and $R_2$. To do so, Label(R) is defined as the label of run R. R is then defined as a set of pairs (l, [x, y]) where l is some label from the re-labeled $P_1 \cup_L P_2$, x is the minimum # of occurrences of l, y is the maximum # of occurrences of l, and $[x, y] \subseteq [0, \infty]$. $R_1 \cup_L R_2$ is computed by considering each pair of elements in $R_1 * R_2$ (i.e., the cross product of $R_1$ and $R_2$), as follows. For each pair $(l_1, [x_1, y_1])$, $(l_2, [x_2, y_2])$, if $l_1 = l_2$, then $(l_1, [x_1, y_1])$, $(l_2, [x_2, y_2])$ becomes $(l_1, [x_1, y_1]) \cup (l_2, [x_2, y_2])$ using an interval union operation. Otherwise, $(l_1, [x_1, y_1])$, $(l_2, [x_2, y_2])$ is the empty set.

Thus, for a member z in $R_1 * R_2$ (i.e., the cross product of $R_1$ and $R_2$), $U_L$ is computed as either $(l_1, [x_1, y_1]) \cup (l_2, [x_2, y_2])$ or the empty set. $R_1 \cup_L R_2$ is then computed by taking the union over those results to form a resulting set S. If S has the same cardinality as $R_1$ and $R_2$, then $R_1 \cup_L R_2$ is S with labels, e.g., Label($R_1$) and Label($R_2$). Otherwise, $R_1 \cup_L R_2$ is $\{R_1, R_2\}$ in which case $R_1$ and $R_2$ are disjoint and they are kept with separate labels.

For example, if:

$R_1 = \{(L_1, [0, 1]), L_2, [1, \infty]), L_3, [1, 1])\}$ $R_2 = \{(L_1, [1, 2]), L_2, [2, 2]), L_3, [1, 1])\}$ Then, $R_1 \cup_L R_2 = \{(L_1, [0, 2]), L_2, [1, \infty]), L_3, [1, 1])\}$ with label Label($R_1$), Label($R_2$).

For another example, if:

$R_1 = \{(L_1, [1, 1]), L_2, [2, \infty]), L_3, [1, 1])\}$ $R_2 = \{(L_1, [0, \infty]), L_2, [1, 1]), L_3, [4, 4])\}$ Then, $R_1 \cup_L R_2 = \{R_1, R_2\}$ because $R_1$ and $R_2$ are disjoint.

For another example, if:

$R_1 = \{L_1, L_2\}$ where $L_1$ is $(L_1, [1, 1])$, etc.

$R_2 = \{L_1, L_2, L_3^*\}$

Then, $R_1 \cup_L R_2 = \{L_1, L_2\}$ with label Label($R_1$), Label($R_2$) and $\{L_1, L_2, L_3+\}$ with label Label($R_2$).

To summarize, $R_1 \cup_L R_2$, the definition of $U_L$ for runs $R_1$ and $R_2$ in accordance with the invention, is first computed according to the above-described procedure. Then, the result is refined by taking the intersection of $R_1$ with $(R_1 \cup_L R_2)$ and the intersection of $R_2$ with $(R_1 \cup_L R_2)$, i.e., $R_1 \cap (R_1 \cup_L R_2)$ and $R_2 \cap (R_1 \cup_L R_2)$. $R_1 \cap (R_1 \cup_L R_2)$ and $R_2 \cap (R_1 \cup_L R_2)$ are performed using a similar methodology as for the union operator $U_L$, but with interval intersection instead of interval union operations.

To achieve this, in exemplary, non-limiting embodiments of the invention, the union run is divided into pieces $R_1$, $R_2$, and $R_1 \cap R_2$. These pieces $R_1$, $R_2$, and $R_1 \cap R_2$ are then labeled with Label($R_1$), Label($R_2$), and Label($R_1$), Label($R_2$), respectively.

Accordingly, where $P_1$ and $P_2$ are unordered patterns, the determination of $P_1 \cup_L P_2$ can be performed. In this regard, the invention enables $P_1 \cup_L P_2$ to be calculated as an unordered pattern with a union pattern portion and a set of accepting runs of the union pattern, with each run labeled with labels from $P_1$, $P_2$ or both. $P_1 \cup_L P_2$ can then be unions with some other unordered pattern $P_3$, which also has a union pattern and a set of labeled runs, and so on for another unordered pattern $P_4$.

Exemplary Non-Limiting Usage Scenarios

For supplemental understanding, a variety of usage scenarios of the present invention illustrate the broad variety of applications to which pattern matching using the Q framework of the invention may be applied in computing systems. The ability to match while preserving action semantics or ordered and unordered information embedded in the trees being transformed thus enables a broad set of pattern matching systems in a computing systems. The actual scenarios chosen, however, are merely exemplary and thus are not to be taken as limiting on the universe of pattern matching to which the invention applies. Indeed, the capabilities of transforming MFSTs in accordance with the invention are, by definition, quite broad since one need not be concerned with losing information pertaining to action constraints, or ordered and unordered information embedded in the tree representations being transformed.

In this regard, as mentioned above, the Q framework enables preservation of such action or ordered and unordered information when transforming MFSTs according to at least the intersection, union and complement transforms. With these three transform operations, a property on tree data structures can be performed known to those of skill in the art as structural compatibility, or sub-typing. Oftentimes, a computing application will want to know whether a given tree is a subset of another given tree, or set of trees (or some transform operation of those trees defined by union, complement or intersection).

Another important class of scenarios to which the invention may be applied is the host of applications that perform static type checking, wherein a compiler looks at a program, and asks for procedural compatibility. Procedural compatibility checks involve pattern matching for a set of trees, and is helpful for finding bugs in computer programs.

Generally, the classes of tests that a user or computing system may wish to implement against a set of tree data, or subset of tree data is limitless. However, some recurring tests generally occur. For instance, often a test will wish to know whether a first tree or set of trees intersects with a second tree or set of trees. Or, one will wish to know whether there is summing for a set of trees, and whether there is coverage of all of the paths of tree traversal. Or a user may wish to know what trees result in a default case. One may also wish to test the empty test, which asks the question of whether any trees are accepted as a pattern match at all. As mentioned, in one embodiment of the invention, the invention enables the following four transform tests: intersection, union, complement and emptiness testing.

The advantageous use of the invention with compilers was mentioned above. The invention can also be used for a host of other scenarios as well, such as schema validation. For instance, a message comes in with a purchase order, and the question is whether the purchase order is compatible against some schema. The pattern matching of the invention can be used to validate the message against the schema regardless of action semantics or ordered/unordered information while preserving the same in the outcome.

Contract checking is another exemplary use of the invention. For instance, a company might have a policy concerning a human resources computing system for the company that states that it must adhere to a set of computer requirements representing a physical system (e.g., X amount of Storage, Y amount of security, Z amount of processing power, etc.). In this regard, each configuration can be represented as a set of requirements in tree representations and according to the tree transform capabilities of the framework of the invention, a systems analyst can transform a computer configuration according to a pre-defined transform and see whether the new computer configuration matches the contract required for the HR computing system.

The invention could further be applied to finding security hole patterns in a set of log data recorded by a computing system, or to determine possible configurations for a computing system. The invention could be applied to a firewall where the messages coming in and out of the firewall can be viewed as trees, and wherein pattern matching can be employed to observe whether any given message should not be left through the firewall. Since the transformation boolean operations mentioned herein and supported by the Q framework can be utilized to form any logic statement, any system of rules in a computing system can be reduced to a tree, and pattern matching can be applied to determine adherence to those rules. Thus, it should be clear that the applications of the invention are limitless.

Finite State Automata and Transducers

For additional context, a finite state machine (FSM) or finite state automaton (FSA) is a model of behavior composed of states, transitions and actions. A state of an FSM stores information about the past, i.e., a state reflects the input changes from the start of a system to a present moment. A transition indicates a state change and is described by a condition that requires fulfillment to enable the transition. An action is a description of an activity that is to be performed at a given moment. There are several action types: Entry, Exit, Input and Transition Actions. Entry actions execute the action when entering the state. Exit actions execute the action when exiting the state. Input actions execute the action dependent on present state and input conditions. Transition actions execute the action when performing a certain transition.

Figure 6A:
FIG. 6A illustrates an exemplary finite state transducer in accordance with the QFX of the invention.

Finite state transducers (FSTs) are a type of FSM that generate output(s) based on given input(s) and/or state(s) using action(s), and can be used for control applications, construction of computer programs, and the like. FIG. 6A illustrates a simple finite state transducer 620. Transducer 620 generates output(s) 630 based on given input(s) 610, as translated, or transformed, by FSM 620. Two types of transducer FSMs that exist are Moore models and Mealy models, which are described in more detail infra. Mixed models are often used as well.

Thus, one can appreciate that many different kinds of computer systems and processes can be modeled as FSMs and FSTs. For instance, any extensible markup language (XML) document can be represented as an FSM using directed graphs. Relational data in a relational database may also be represented in this fashion, e.g., whereby input (e.g., queries) is translated by the FST, which represents the underlying relational store, to outputs (e.g., query results). In general, when used to model computer processes, FSTs are typically represented as edge-labeled directed graphs, where each vertex represents one of n states and each edge a transition from one state to the other on receipt of the alphabet symbol that labels the edge.

When many complex subsystems and processes in a computer system are communicatively coupled as part of an overall system, to design software for the overall system, a designer might first represent each of the subsystems and processes as FSTs, e.g., as directed graphs, or other equivalent representations. Then, to create a complex computer program for a single system that connects different subsystems, the FSTs, e.g., directed graphs, may be combined or otherwise transformed according to various operations in order to form new directed graph(s) that represent the behavior of the overall system.

For instance, suppose a user Jane makes a request from a client computer to an Internet server via the Internet for a friend John's vacation photographs stored in a database and served by an application on the Internet server. As can be appreciated, the end to end communications that take place according to such a request are numerous, beginning with authentication of Jane and ensuring that Jane is authorized to view John's photos in addition to performing the request itself. As a simple example, the making and handling of the request itself can be modeled as a first FST. At the server, a second FST may model the behavior of checking if Jane is a friend of John's with reference to various rules, such as may be found in a set of access control lists (ACLs) and corresponding policy, which might be represented as a chain of XML fragments, trees, or directed graphs. Additionally, a third FST may model the relational database itself. By transforming, combining, matching, translating, etc. the first, second and third sets of FSTs, a new directed graph can be formed that represents the system, and returns a yes ("authorized") or ("unauthorized") answer for the specific input request, and that handles delivery of the photos.

Figure 8A:
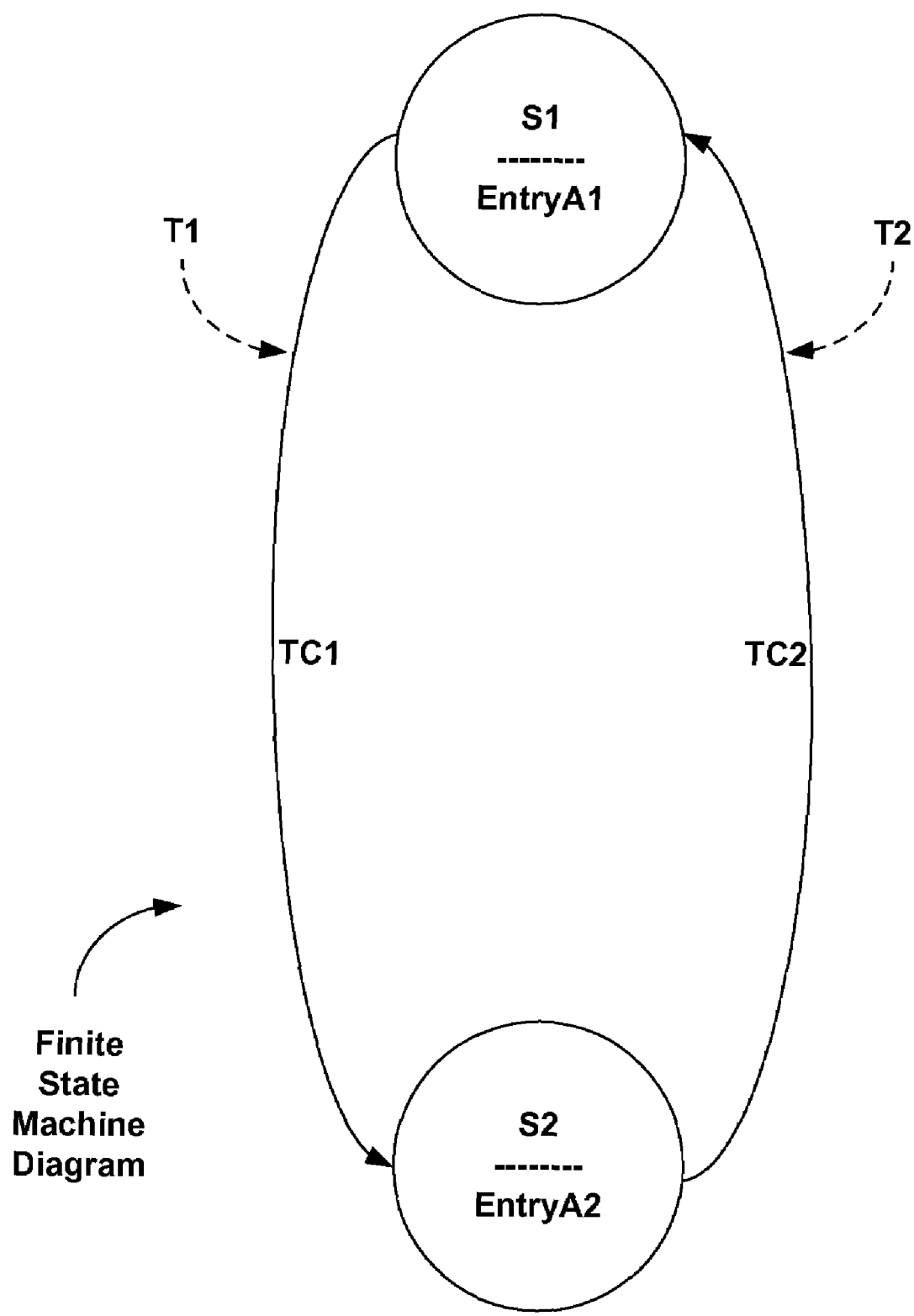
FIG. 8A illustrates exemplary modeling of an FSM in a state transition diagram.

In general, an FSM can be represented using a state diagram (or state transition diagram) as in the simple state transition diagram of FIG. 8A. In FIG. 8A, two states S1 and S2 are represented having entry actions EntryA1 and EntryA2, respectively, meaning that entry action EntryA1 is performed when state S1 is entered and entry action EntryA2 is performed when state S2 is entered. In turn, a transition T1 from state S1 to S2 occurs when transition condition TC1 happens and a transition T2 from state S2 to S1 occurs when transition condition TC2 happens. State S1 might be "the door is open" and state S2 might be "the door is closed." To go from state S1 to state S2, therefore, transition T1 must occur, which occurs only when transition condition TC1 occurs, which might be "a force is causing the door to move in the closed direction." The entry action EntryA2 that executes when entering state S2 thus might be "close the door." A similar transition chain can be followed in opening the door, i.e., going from state S2 to state S1.

Besides diagrams, different types of state transition tables can also be used to represent FSA. A common representation of such a state transition table STT1 is shown in FIG. 7A, wherein the combination of a column of the table STT1, such as current state B and a row of the table STT1, such as condition Y, indicates the next state that occurs when condition Y happens while in state B, namely, state C. However, with a table such as state transition table STT1, the complete actions information can be added only using footnotes.

There are, however, FSM definitions including the full actions information using state tables. For instance, an FSM defined in a virtual environment is called a virtual finite state machine (VFSM) which relates to a software specification method used to describe the behavior of a control system using assigned names of input control properties and of output actions.

The virtual environment characterizes the environment in which a VFSM operates and is defined by three sets of names: input names, output names and state names. Input names are represented by the control properties of all available variables. Output names are represented by all the available actions on the variables and state names are defined for each of the states of the FSM. The input names are used to build virtual conditions to perform state transitions or input actions. The virtual conditions are built using positive logic algebra. The output names are used to trigger actions (entry actions, exit actions, input actions or transition actions).

A state table defines the details of the behavior of a state of a VFSM, as shown by the exemplary state table ST1 of FIG. 7B. State transition table ST1 includes three columns: in the first column, state names SN are used, in the second column, the virtual conditions CO built out of input names using positive logic algebra are placed and in the third column, the output names used to trigger actions AC appear.

In addition to their use in modeling reactive systems presented here, FSA are significant in many different areas, including linguistics, computer science, philosophy, biology, mathematics, and logic. Finite state machines are one type of the automata studied in automata theory and the theory of computation. In computer science, finite state machines are widely used in modeling of application behavior, design of hardware digital systems, software engineering, compilers, and the study of computation and languages. A complete survey of the applications of FSAs is virtually impossible— sufficed to say, there are virtually limitless applications of FSAs to systems everywhere.

In general, a transducer computes a relation between two formal languages. In the context of FSMs and FSAs, transducers generate output based on a given input and/or a state using actions, and can be used for control applications. Two types of transducer FSMs are generally distinguished: Moore models and Mealy models. In practice, mixed models are often used.

Figure 8B:
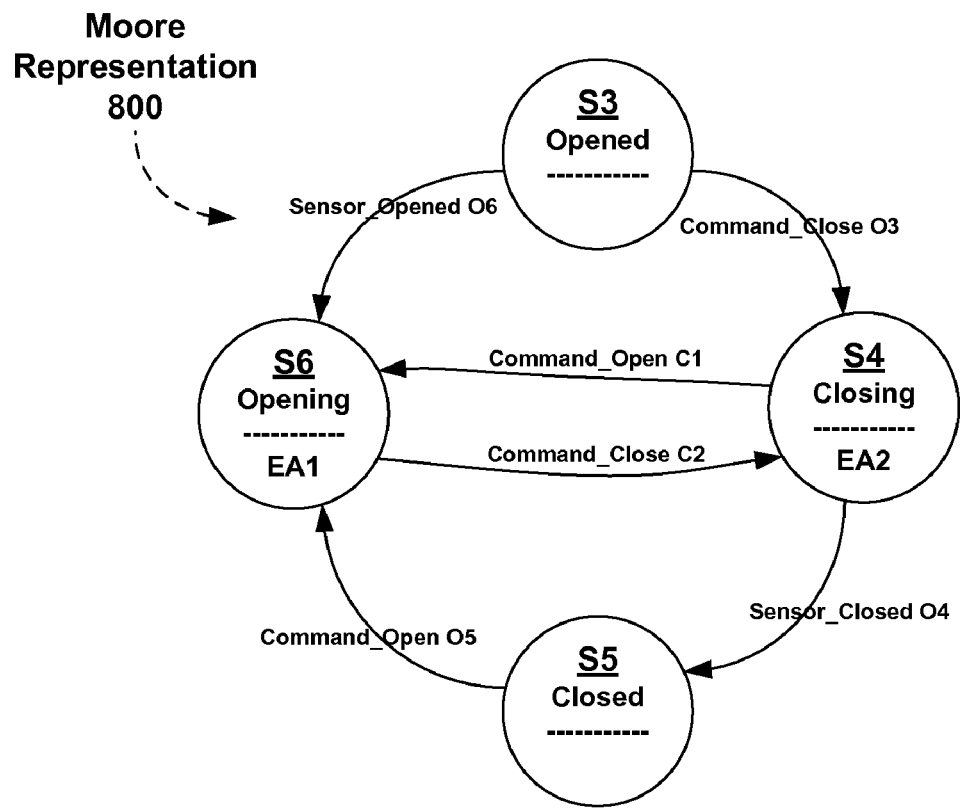
FIG. 8B shows a transducer representing a Moore model example as an exemplary type of state machine data structure in accordance with the invention.

For illustrative purposes, FIG. 8B shows a transducer FSM 800 showing a Moore model example having four states S3, S4, S5 and S6, with outputs O3, O4, O5 and O6, respectively. With a Moore machine, the FSM uses only entry actions, i.e., output depends only on the state. The advantage of the Moore model is as a simplification of the behavior. The example in FIG. 8B shows a Moore FSM 800 of an elevator door. The state machine recognizes two commands: "command_open" C1 and "command_close" C2, which trigger state changes. For instance, the entry action EA1 in "Opening" state S6 starts a motor opening the door and the entry action EA2 in "Closing" state S4 starts a motor in the other direction closing the door. "Opened" state S3 and "Closed" state S5 do not perform any actions in this example, rather they signal to the outside systems (e.g., to other state machines) that: "door is open" or "door is closed," respectively.

Figure 8C:
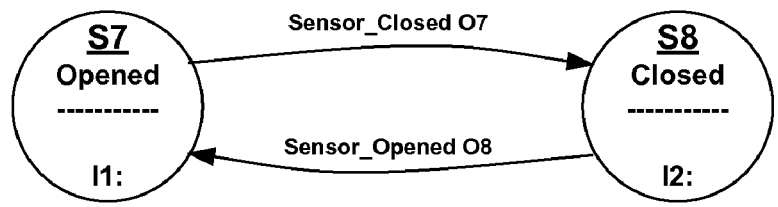
FIG. 8C shows a transducer representing a Mealy model example as an exemplary type of state machine data structure in accordance with the invention.

FIG. 8C illustrates a transducer FSM 810 showing a Mealy model example having two states S7 and S8, outputs O7 and O8 and input actions I1 and I2, respectively. With a Mealy machine, the FSM uses only input actions, i.e., output depends on input and state. The use of a Mealy FSM often leads to a reduction of the number of states. The example in FIG. 8C shows a Mealy FSM 810 implementing the same behavior as in the Moore example 800 of FIG. 8B. There are two input actions: "start motor to close the door if command_close arrives" I1 and "start motor in the other direction to open the door if command_open arrives" I2.

Yet another distinction for finite automata is between deterministic finite automata (DFA) and non-deterministic (NDFA) or generalized non-deterministic finite automata (GNFA). In deterministic automata, for each state, there is exactly one transition for each possible input. In non-deterministic automata, there can be none or more than one transition from a given state for a given possible input. This distinction is relevant in practice, but not in theory, as there exists an algorithm which can transform any NDFA into an equivalent DFA, although this transformation typically significantly increases the complexity of the automaton.

An FSM with only one state is called a combinatorial FSM and uses only input actions. This concept is useful in cases where a number of FSM are required to work together, and where it is convenient to consider a purely combinatorial part as a form of FSM to suit the design tools.

In general, a transducer computes a relation between two formal languages. The class of relations computed by finite state transducers (FSTs) is known as the class of rational relations. FSTs are typically useful in natural language processing research.

An FST is a finite state machine with two tapes, which is contrasted with an ordinary finite state automaton, which has a single tape. As a matter of nomenclature, an automaton is said to recognize a string if the content of its tape is viewed as input. In other words, the automaton computes a function that maps strings into the set $\{0, 1\}$. Alternatively, it is said that an automaton generates strings, which means its tape is viewed as an output tape. On this view, the automaton generates a formal language, which is a set of strings. The two views of automata are equivalent: the function that the automaton computes is precisely the indicator function of the set of strings it recognized. The class of languages generated by finite automata is known as the class of regular languages.

The two tapes of a transducer are typically viewed as an input tape and an output tape. In this regard, a transducer is said to transduce (i.e., translate) the contents of its input tape to its output tape, by accepting a string on its input tape and generating another string on its output tape. It may do so nondeterministically and it may produce more than one output for each input string. A transducer may also produce no output for a given input string, in which case it is said to reject the input.

For additional context, formally, a finite state transducer T is a tuple $(Q, \Sigma, \Gamma, I, F, \delta)$ such that:

Q is a finite set, the set of states;
$\Sigma$ is a finite set, called the input alphabet;
$\Gamma$ is a finite set, called the output alphabet;
I is a subset of Q, the set of initial states;
F is a subset of Q, the set of final states; and
$\delta \subseteq Q \times (\Sigma \cup \{\epsilon\}) \times (\Gamma \cup \{\epsilon\}) \times Q$ (where $\epsilon$ is the empty string) is the transition relation.

$(Q, \delta)$ can be viewed as a labeled directed graph, known as the transition graph of T: the set of vertices is Q, and (q, a, b, r)$\in \delta$ means that there is a labeled edge going from vertex q to vertex r. In this respect, a is the input label and b the output label of that edge.

Define the extended transition relation $\delta^*$ as the smallest set such that:

$\delta \subseteq \delta^*$;
(q, $\epsilon$, $\epsilon$, q)$\in \delta$ for all q$\in$Q; and
whenever (q, x, y, r)$\in \delta^*$ and (r, a, b, s)$\in \delta$ then (q, xa, yb, s)$\in \delta^*$.

The extended transition relation is essentially the reflexive transitive closure of the transition graph that has been augmented to take edge labels into account. The elements of $\delta^*$ are known as paths. The edge labels of a path are obtained by concatenating the edge labels of its constituent transitions in order.

The behavior of the transducer T is the rational relation [T] defined as follows: x[T]y if and only if there exists i$\in$I and f$\in$F such that (i, x, y, f)$\in \delta^*$. This is to say that T transduces a string x$\in \Sigma^*$ into a string y$\in \Gamma^*$ if there exists a path from an initial state to a final state whose input label is x and whose output label is y.

The following operations defined on finite automata also apply to finite transducers: Union, concatenation, Kleene closure, composition, projection of the input tape and projection of the output tape.

With respect to the union operation, given transducers T and S, there exists a transducer T∪S such that X[T∪S]y if and only if x[T]y or x[S]y.

With respect to the concatenation operation, given transducers T and S, there exists a transducer T•S such that wx[T•S]yz if and only if w[T]y and x[S]z.

With respect to the Kleene closure operation, given a transducer T, there exists a transducer T* with the following properties: (1) $\epsilon$[T*]$\epsilon$; (2) if w[T*]y and x[T]z then wx[T*]yz; and x[T*]y does not hold unless mandated by (1) or (2).

Note that there is no notion of intersection of transducers. Instead, there is an operation of composition, which is specific to transducers and whose construction is similar to that of intersection of automata. Composition is defined as follows:

Given a transducer T on alphabets $\Sigma$ and $\Gamma$ and a transducer S on alphabets $\Gamma$ and $\Delta$, there exists a transducer T○S on $\Sigma$ and $\Delta$ such that x[T○S]z if and only if there exists a string y$\in \Gamma^*$ such that x[T]y and y[S]z.

One can also project out either tape of a transducer to obtain an automaton. There are two projection functions: $\pi_1$ preserves the input tape, and $\pi_2$ preserves the output tape. The first projection, $\pi_1$ is defined as follows:

Given a transducer T, there exists a finite automaton $\pi_1$T such that $\pi_1$T accepts x if and only if there exists a string y for which x[T]y. The second projection, $\pi_2$ is defined similarly.

In addition, finite state machines can be used to represent a partial order, which formalizes the intuitive concept of an ordering, sequencing, or arrangement of a set's elements. A partial order need not necessarily be a total order, which guarantees the mutual comparability of all objects in the set. In this regard, a total order is a kind of partial order defined for all pairs of items of a set.

Thus, a partial order is defined for some, but not necessarily all, pairs of items. For instance, the sets {a, b} and {a, c, d} are subsets of {a, b, c, d}, but neither is a subset of the other. So "subset of" is a partial order on sets. For another example, $\leq$ (less than or equal to) is a total order on integers, since, for any two integers, one of the integers is always less than or equal to the other.

Figure 6B:
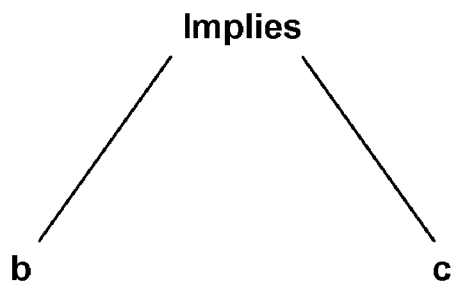
FIGS. 6B and 6C illustrate tree data structure representing an exemplary ordered nest and unordered nest, respectively, in connection with which the QFX of the invention operates to preserve both ordered and unordered nest information.
Figure 6C:
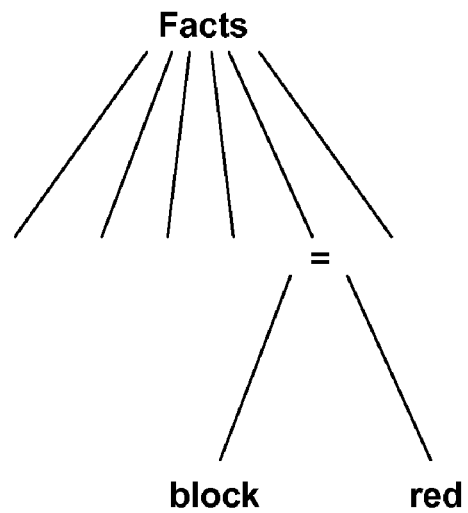

As shown in FIG. 6B, an ordered nest represents that the information that "a" "implies" "b," but not the other way around (i.e., "b" does not necessarily "imply" "a") according to the ordered hierarchy. Thus, the tree of FIG. 6B is an example of a representation of an ordered nest. The tree of FIG. 6C, in contrast, represents an example of an unordered nest. In this regard, whether the factual information represented by the tree of FIG. 6C is read from left to right, or right to left, the same factual information is gleaned, namely, "block equals (is) red" or "red equals (is) block" both indicate logically that the block is (=) red. Accordingly, such information is unordered and the order in which the tree is traversed is not critical to gaining the unordered information.

Exemplary Networked and Distributed Environments

One of ordinary skill in the art can appreciate that the invention can be implemented in connection with any computer or other client or server device, which can be deployed as part of a computer network, or in a distributed computing environment, connected to any kind of data store. In this regard, the present invention pertains to any computer system or environment having any number of memory or storage units, and any number of applications and processes occurring across any number of storage units or volumes, which may be used in connection with embodiments of the QFX of the present invention. The present invention may apply to an environment with server computers and client computers deployed in a network environment or a distributed computing environment, having remote or local storage. The present invention may also be applied to standalone computing devices, having programming language functionality, interpretation and execution capabilities for generating, receiving and transmitting information in connection with remote or local services and processes. As described earlier, MFSTs have ubiquitous applicability to software processes across multiple machines and computing devices, and thus the techniques for translating grammars to MFSTs in accordance with the present invention can be applied with great efficacy in a variety of computing environments.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the QFX of the invention.

Figure 9:
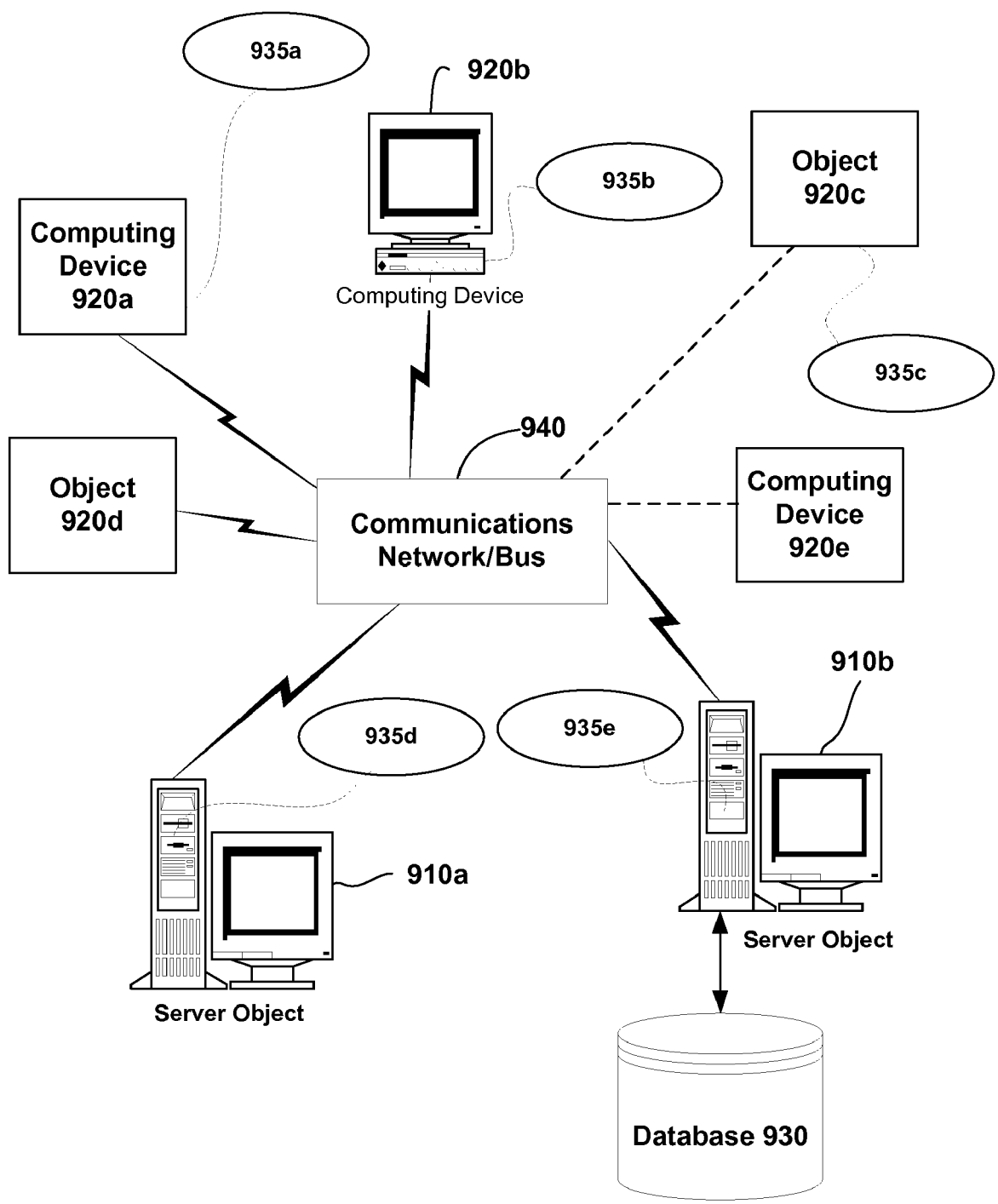
FIG. 9 is a block diagram representing an exemplary non-limiting networked environment in which the present invention may be implemented.

FIG. 9 provides a schematic diagram of an exemplary networked or distributed computing environment. The distributed computing environment comprises computing objects 910a, 910b, etc. and computing objects or devices 920a, 920b, 920c, 920d, 920e, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 940. This network may itself comprise other computing objects and computing devices that provide services to the system of FIG. 9, and may itself represent multiple interconnected networks. In accordance with an aspect of the invention, each object 910a, 910b, etc. or 920a, 920b, 920c, 920d, 920e, etc. may contain an application that might make use of an API, or other object, software, firmware and/or hardware, suitable for use with the various embodiments of QFX in accordance with the invention.

It can also be appreciated that an object, such as 920c, may be hosted on another computing device 910a, 910b, etc. or 920a, 920b, 920c, 920d, 920e, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to embodiments of the QFX of the invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., DSL, Cable modem, etc.) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, any of the computing devices of the present invention may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 9, as an example, computers 920a, 920b, 920c, 920d, 920e, etc. can be thought of as clients and computers 910a, 910b, etc. can be thought of as servers where servers 910a, 910b, etc. maintain the data that is then replicated to client computers 920a, 920b, 920c, 920d, 920e, etc., although any computer can be considered a client, a server, or both, depending on the circumstances. Any of these computing devices may be processing data or requesting services or tasks that may implicate the tree grammars and translation techniques of the various embodiments of the QFX of the invention.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the QFX of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 9 illustrates an exemplary networked or distributed environment, with server(s) in communication with client computer (s) via a network/bus, in which the present invention may be employed. In more detail, a number of servers 910a, 910b, etc. are interconnected via a communications network/bus 940, which may be a LAN, WAN, intranet, GSM network, the Internet, etc., with a number of client or remote computing devices 920a, 920b, 920c, 920d, 920e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to compile and execute attributed tree grammars, and translate to MFSTs in accordance with the Q framework defined by the invention.

In a network environment in which the communications network/bus 940 is the Internet, for example, the servers 910*a*, 910*b*, etc. can be Web servers with which the clients 920*a*, 920*b*, 920*c*, 920*d*, 920*e*, etc. communicate via any of a number of known protocols such as HTTP. Servers 910*a*, 910*b*, etc. may also serve as clients 920*a*, 920*b*, 920*c*, 920*d*, 920*e*, etc., as may be characteristic of a distributed computing environment.

As mentioned, communications may be wired or wireless, or a combination, where appropriate. Client devices 920*a*, 920*b*, 920*c*, 920*d*, 920*e*, etc. may or may not communicate via communications network/bus 14, and may have independent communications associated therewith. For example, in the case of a TV or VCR, there may or may not be a networked aspect to the control thereof. Each client computer 920*a*, 920*b*, 920*c*, 920*d*, 920*e*, etc. and server computer 910*a*, 910*b*, etc. may be equipped with various application program modules or objects 135*a*, 135*b*, 135*c*, etc. and with connections or access to various types of storage elements or objects, across which files or data streams may be stored or to which portion (s) of files or data streams may be downloaded, transmitted or migrated. Any one or more of computers 910*a*, 910*b*, 920*a*, 920*b*, 920*c*, 920*d*, 920*e*, etc. may be responsible for the maintenance and updating of a database 930 or other storage element, such as a database or memory 930 for storing data processed or saved according to the invention. Thus, the present invention can be utilized in a computer network environment having client computers 920*a*, 920*b*, 920*c*, 920*d*, 920*e*, etc. that can access and interact with a computer network/bus 940 and server computers 910*a*, 910*b*, etc. that may interact with client computers 920*a*, 920*b*, 920*c*, 920*d*, 920*e*, etc. and other like devices, and databases 930.

Exemplary Computing Device

Figure 10:
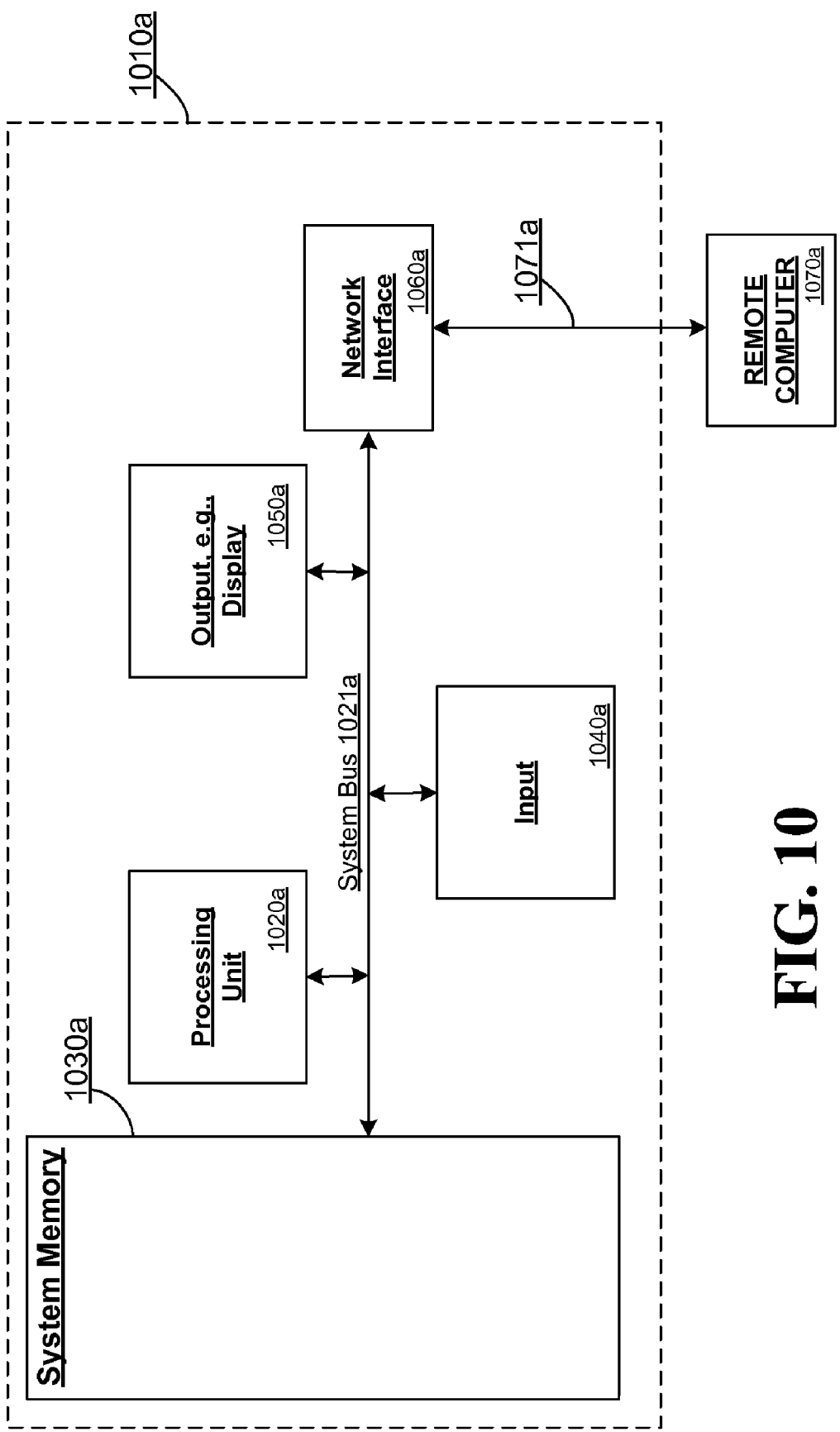
FIG. 10 is a block diagram representing an exemplary non-limiting computing system or operating environment in which the present invention may be implemented.

As mentioned, the invention applies to any device wherein it may be desirable to apply techniques of the QFX defined in accordance with the invention. It should be understood, therefore, that handheld, portable and other computing devices and computing objects of all kinds are contemplated for use in connection with the present invention, i.e., anywhere that a device may implement software processes representing state machines or otherwise receive, process or store data. Accordingly, the below general purpose remote computer described below in FIG. 10 is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 10 thus illustrates an example of a suitable computing system environment 1000*a* in which the invention may be implemented, although as made clear above, the computing system environment 1000*a* is only one example of a suitable computing environment for a media device and is not intended to suggest any limitation as to the scope of use or functionality of the invention. Neither should the computing environment 1000*a* be interpreted as having any dependency or requirement relating to any one or combination of components illustrated in the exemplary operating environment 1000*a*.

With reference to FIG. 10, an exemplary remote device for implementing the invention includes a general purpose computing device in the form of a computer 1010*a*. Components of computer 1010*a* may include, but are not limited to, a processing unit 1020*a*, a system memory 1030*a*, and a system bus 1021*a* that couples various system components including the system memory to the processing unit 1020*a*. The system bus 1021*a* may be any of several types of bus structures including a memory bus or memory controller, a peripheral bus, and a local bus using any of a variety of bus architectures.

Computer 1010*a* typically includes a variety of computer readable media. Computer readable media can be any available media that can be accessed by computer 1010*a*. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1010*a*. Communication media typically embodies computer readable instructions, data structures, program modules or other data in a modulated data signal such as a carrier wave or other transport mechanism and includes any information delivery media.

The system memory 1030*a* may include computer storage media in the form of volatile and/or nonvolatile memory such as read only memory (ROM) and/or random access memory (RAM). A basic input/output system (BIOS), containing the basic routines that help to transfer information between elements within computer 1010*a*, such as during start-up, may be stored in memory 1030*a*. Memory 1030*a* typically also contains data and/or program modules that are immediately accessible to and/or presently being operated on by processing unit 1020*a*. By way of example, and not limitation, memory 1030*a* may also include an operating system, application programs, other program modules, and program data.

The computer 1010*a* may also include other removable/non-removable, volatile/nonvolatile computer storage media. For example, computer 1010*a* could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1021a through a non-removable memory interface such as an interface, and a magnetic disk drive or optical disk drive is typically connected to the system bus 1021a by a removable memory interface, such as an interface.

A user may enter commands and information into the computer 1010a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 1020a through user input 1040a and associated interface(s) that are coupled to the system bus 1021a, but may be connected by other interface and bus structures, such as a parallel port, game port or a universal serial bus (USB). A graphics subsystem may also be connected to the system bus 1021a. A monitor or other type of display device is also connected to the system bus 1021a via an interface, such as output interface 1050a, which may in turn communicate with video memory. In addition to a monitor, computers may also include other peripheral output devices such as speakers and a printer, which may be connected through output interface 1050a.

The computer 1010a may operate in a networked or distributed environment using logical connections to one or more other remote computers, such as remote computer 1070a, which may in turn have media capabilities different from device 1010a. The remote computer 1070a may be a personal computer, a server, a router, a network PC, a peer device or other common network node, or any other remote media consumption or transmission device, and may include any or all of the elements described above relative to the computer 1010a. The logical connections depicted in FIG. 10 include a network 1071a, such local area network (LAN) or a wide area network (WAN), but may also include other networks/buses. Such networking environments are commonplace in homes, offices, enterprise-wide computer networks, intranets and the Internet.

When used in a LAN networking environment, the computer 1010a is connected to the LAN 1071a through a network interface or adapter. When used in a WAN networking environment, the computer 1010a typically includes a communications component, such as a modem, or other means for establishing communications over the WAN, such as the Internet. A communications component, such as a modem, which may be internal or external, may be connected to the system bus 1021a via the user input interface of input 1040a, or other appropriate mechanism. In a networked environment, program modules depicted relative to the computer 1010a, or portions thereof, may be stored in a remote memory storage device. It will be appreciated that the network connections shown and described are exemplary and other means of establishing a communications link between the computers may be used.

Exemplary Distributed Computing Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the invention may also be implemented via an operating system, or a "middle man" object, a control object, hardware, firmware, intermediate language instructions or objects, etc., such that the embodiments of the QFX in accordance with the invention may be included in, supported in or accessed via all of the languages and services enabled by managed code, such as .NET code, and in other distributed computing frameworks as well.

There are multiple ways of implementing the present invention, e.g., an appropriate API, tool kit, driver code, operating system, control, standalone or downloadable software object, etc. which enables to use the QFX of the invention. The invention contemplates the use of the invention from the standpoint of APIs (or other software object), as well as from the viewpoint of data structures, software or hardware object that may implement at least part of the QFX in accordance with the invention. Thus, various implementations of the invention described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts may be applied to any computing device or system in which it is desirable to include MFSTs implementing transformations. For instance, the QFX of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the QFX of the present invention, e.g., through the use of a data processing API, software object, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter are better appreciated with reference to the flowchart of FIG. 5. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks, or otherwise provide equivalent functionality, from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the QFX more adaptive as well as efficient and intelligent.

While the present invention has been described in connection with the preferred embodiments of the various Figs., it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language and applies to translating any grammars that include actions. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for transforming at least one-data structure specifying at least one tree structure in a computing system to at least one modular finite state transducer (MFST), comprising:

receiving at least one data structure onto a memory unit configured to include either ordered, unordered, or unordered and ordered information specifying at least one tree structure representing at least one finite state transducer (FST) including semantics for defining ordered and unordered information; and for any type of finite state machine (FSM) model represented by the at least one data structure, transforming the at least one data structure to at least one MFST while preserving the ordered and unordered information of the at least one data structure in the at least one MFST, wherein said transforming includes performing any of an intersection, union and complement operation, or performing any transformation operation that is reducible to any of an intersection, union and complement operation, on the at least one data structure, wherein it is determinable whether the resulting MFST accepts a non-empty input.

2. The method of claim 1, wherein said transforming includes transforming the at least one data structure with a translation grammar that preserves the ordered and unordered information in the at least one MFST irrespective of the type of FSM model represented by the at least one tree structure specified by the at least one data structure.

3. The method of claim 1, wherein said transforming includes performing at least one control flow analysis algorithm on the FSTs represented by at least one data structure that preserves the ordered and unordered semantics information of the at least one data structure for any type of representation.

4. The method of claim 1, wherein said transforming includes transforming the at least one data structure with a pre-defined translation grammar that preserves both ordered and unordered nest information of the at least one data structure irrespective of the type of FSM model represented by the at least one tree structure specified by the at least one data structure.

5. The method of claim 1, wherein said receiving includes receiving at least one data structure specifying at least one directed graph structure representing the at least one FST including ordered and unordered semantics for defining list and set pattern information.

6. The method of claim 4, wherein said receiving includes receiving at least one data structure specifying at least one extensible markup language (XML) document representing the at least one FST including the semantics for defining ordered and unordered information.

7. The method of claim 1, wherein said transforming includes performing an empty nest test on at least one data structure.

8. The method of claim 1, wherein said transforming includes performing a structural compatibility test on at least two data structures while preserving the ordered and unordered information.

9. The method of claim 1, wherein said receiving includes receiving at least one data structure specifying at least one non-deterministic tree data structure and said transforming includes transforming the at least one data structure to a deterministic MFST.

10. A computer readable medium comprising computer executable instructions for performing the method of claim 1.

11. A computing device comprising means for performing the method of claim 1.

12. A transformation framework for transducing directed graph data structures representing finite state transducers (FSTs) to a modular finite state transducer (MFST) in a computing system, comprising:

means for storing, on a memory unit, a plurality of directed graph data structures of varying types configured to include either ordered, unordered, or unordered and ordered information for representing FSTs in a computing system including ordered and unordered semantics information of the plurality of directed graph data structures; and a transducer that analyzes the plurality of directed graph data structures based on a pre-defined tree grammar and transduces the plurality of directed graph data structures to at least one MFST while preserving the ordered and unordered semantics information of the plurality of directed graph data structures, wherein the transducer performs any of intersect, complement and union operations, or performs any transformations that are reducible to any of intersection, union and complement operations, on the plurality of directed graph data structures, wherein it is determinable whether the resulting MFST accepts a non-empty input.

13. The transformation framework of claim 12, wherein said transducer performs at least one control flow analysis algorithm on the FSTs represented by the plurality of directed graph data structures that preserves the ordered and unordered semantics information of the plurality of directed graph data structures across any type of directed graph representation.

14. The transformation framework of claim 12, wherein said transducer includes a transformation engine that performs specialized binding handling when transducing the plurality of directed graph data structures, wherein the specialized binding handling includes performing binding for the ordered and unordered semantics information during a pattern matching process for matching patterns of the plurality of directed graph data structures.

15. The transformation framework of claim 12, wherein said transducer inlines at least one transducer definition as defined by a directed graph data structure of the plurality of directed graph data structures while preserving the ordered and unordered semantics information.

16. The transformation framework of claim 12, wherein the transducer includes a transformation engine component for matching the at least one data structure to at least one MFST including matching both ordered and unordered nest information contained in the at least one data structure.

17. The transformation framework of claim 16, wherein said at least one data structure specifies at least one non-deterministic tree structure and said transformation engine component transforms the at least one data structure to a deterministic MFST.

18. The transformation framework of claim 12, further comprising:
an interface for receiving a directed graph data structure of the plurality of directed graph data structures that defines and translates directed graph data structures according to said pre-defined tree grammar.

19. A compiler for transforming directed graph data structures representing finite state transducers (FSTs) to a modular finite state transducer (MFST) in a computing system, comprising:
a plurality of directed graph data structures stored on a memory unit and configured to include either ordered, unordered, or unordered and ordered information representing FSTs for processes in a computing system including ordered and unordered information defining ordered lists and unordered sets for the processes; and
a transformation engine that analyzes the plurality of directed graph data structures based on a defined tree grammar and transduces the plurality of directed graph data structures to at least one MFST while preserving the ordered and unordered information of the plurality of directed graph data structures, wherein the transformation engine performs any of intersect, complement and union operations, or performs any transformations that are reducible to any of intersection, union and complement operations, on the plurality of directed graph data structures to generate said at least one MFST, wherein it is determinable whether the resulting MFST accepts a non-empty input.

20. The compiler of claim 19, wherein the plurality of directed graph data structures are represented according to varying FST model types for representing ordered and unordered information.

\* \* \* \* \*